(12) United States Patent  
Kaye

(10) Patent No.: US 7,291,191 B2  
(45) Date of Patent: Nov. 6, 2007

(54) FUEL CELL CARTRIDGE FILTERS AND PRESSURE RELIEF

(75) Inventor: Ian W. Kaye, Livermore, CA (US)

(73) Assignee: UltraCell Corporation, Livermore, CA (US)

( * ) Notice: Subject to any disclaimer, the term of this patent is extended or adjusted under 35 U.S.C. 154(b) by 0 days.

(21) Appl. No.: 11/229,049

(22) Filed: Sep. 16, 2005

(65) Prior Publication Data

US 2006/0070891 A1    Apr. 6, 2006

Related U.S. Application Data

(62) Division of application No. 10/877,766, filed on Jun. 25, 2004.

(60) Provisional application No. 60/483,416, filed on Jun. 27, 2003, provisional application No. 60/483,415, filed on Jun. 27, 2003, provisional application No. 60/482,996, filed on Jun. 27, 2003.

(51) Int. Cl.  
*H01M 8/00* (2006.01)  
*H01M 8/04* (2006.01)

(52) U.S. Cl. ............... 55/385.4; 55/385.1; 429/33; 429/41; 136/224; 204/252; 204/283; 204/284; 204/292; 204/295; 205/338; 205/343; 205/637

(58) Field of Classification Search ............... 55/385.1, 55/385.4; 429/33, 41; 205/338, 343, 637; 136/224; 204/252, 283, 284, 292, 295  
See application file for complete search history.

(56) References Cited

U.S. PATENT DOCUMENTS 5,081,095 A    1/1992    Bedford et al.  
5,525,436 A    6/1996    Savinell et al.

(Continued)

FOREIGN PATENT DOCUMENTS

DE    19841993    3/2000  
JP    2002-161997    7/2002

(Continued)

OTHER PUBLICATIONS

S. Ahmed et al., "Catalytic Partial Oxidation Reforming of Hydrocarbon Fuels", Nov. 16-19, 1998, 1998 Fuel Cell Seminar, Palm Springs, CA.

(Continued)

*Primary Examiner*—Duane Smith  
*Assistant Examiner*—Minh-Chad T. Pham  
(74) *Attorney, Agent, or Firm*—Beyer Weaver LLP

(57) ABSTRACT

Described herein is a portable storage device that stores a hydrogen fuel source. The storage device includes a bladder that contains the hydrogen fuel source and conforms to the volume of the hydrogen fuel source. A housing provides mechanical protection for the bladder. The storage device also includes a connector that interfaces with a mating connector to permit transfer of the fuel source between the bladder and a device that includes the mating connector. The device may be a portable electronics device such as a laptop computer. Refillable hydrogen fuel source storage devices and systems are also described. Hot swappable fuel storage systems described herein allow a portable hydrogen fuel source storage device to be removed from a fuel processor or electronics device it provides the hydrogen fuel source to, without shutting down the receiving device or without compromising hydrogen fuel source provision.

34 Claims, 7 Drawing Sheets

U.S. PATENT DOCUMENTS

| | | |
|---|---|---|
| 5,534,328 A | 7/1996 | Ashmead et al. |
| 5,601,938 A | 2/1997 | Mayer et al. |
| 5,611,214 A | 3/1997 | Wegeng et al. |
| 5,641,585 A | 6/1997 | Lessing et al. |
| 5,716,727 A | 2/1998 | Savinell et al. |
| 5,789,093 A | 8/1998 | Malhi |
| 5,811,062 A | 9/1998 | Wegeng et al. |
| 5,961,930 A | 10/1999 | Chatterjee et al. |
| 5,961,932 A | 10/1999 | Ghosh et al. |
| 6,077,620 A | 6/2000 | Pettit |
| 6,080,501 A | 6/2000 | Kelley et al. |
| 6,193,501 B1 | 2/2001 | Masel et al. |
| 6,200,536 B1 | 3/2001 | Tonkovich et al. |
| 6,245,214 B1 | 6/2001 | Rehg et al. |
| 6,265,093 B1 | 7/2001 | Surampudi et al. |
| 6,268,077 B1 | 7/2001 | Kelley et al. |
| 6,280,865 B1 | 8/2001 | Eisman et al. |
| 6,312,846 B1 | 11/2001 | Marsh |
| 6,406,808 B1 | 6/2002 | Pratt et al. |
| 6,415,860 B1 | 7/2002 | Kelly et al. |
| 6,423,434 B1 | 7/2002 | Pratt et al. |
| 6,447,945 B1 | 9/2002 | Streckert et al. |
| 6,460,733 B2 | 10/2002 | Acker et al. |
| 6,465,119 B1 | 10/2002 | Koripella et al. |
| 6,470,569 B1 | 10/2002 | Lippert et al. |
| 6,506,513 B1 | 1/2003 | Yonetsu et al. |
| 6,537,506 B1 | 3/2003 | Schwalbe et al. |
| 6,541,676 B1 | 4/2003 | Franz et al. |
| 6,569,553 B1 | 5/2003 | Koripella et al. |
| 6,630,518 B1 | 10/2003 | Paronen |
| 6,638,654 B2 | 10/2003 | Jankowksi et al. |
| 6,660,421 B2 | 12/2003 | Celemin et al. |
| 6,673,130 B2 | 1/2004 | Jankowski et al. |
| 6,713,201 B2 | 3/2004 | Bullock et al. |
| 6,739,578 B2 | 5/2004 | Barton et al. |
| 6,753,036 B2 | 6/2004 | Jankowski et al. |
| 6,794,067 B1 | 9/2004 | Acker et al. |
| 6,821,666 B2 | 11/2004 | Morse et al. |
| 6,828,049 B2 | 12/2004 | Bullock et al. |
| 6,885,298 B2 | 4/2005 | Everson et al. |
| 6,913,998 B2 | 7/2005 | Jankowski et al. |
| 6,921,603 B2 | 7/2005 | Morse et al. |
| 2001/0029974 A1 | 10/2001 | Cohen et al. |
| 2001/0045364 A1 | 11/2001 | Hockaday et al. ........... 205/338 |
| 2002/0012825 A1 | 1/2002 | Sasahara et al. |
| 2002/0018925 A1 | 2/2002 | Celemin et al. |
| 2002/0045082 A1 | 4/2002 | Marsh |
| 2002/0076599 A1 | 6/2002 | Neutzler et al. |
| 2002/0081468 A1 | 6/2002 | Shioya |
| 2002/0094462 A1 | 7/2002 | Shioya |
| 2002/0098119 A1 | 7/2002 | Goodman |
| 2002/0106540 A1 | 8/2002 | Shioya |
| 2002/0114984 A1 | 8/2002 | Edlund et al. ................ 429/19 |
| 2002/0127141 A1 | 9/2002 | Acker |
| 2002/0127451 A1 | 9/2002 | Cao et al. |
| 2002/0131915 A1 | 9/2002 | Shore et al. |
| 2002/0132156 A1 | 9/2002 | Ruhl et al. |
| 2002/0147107 A1 | 10/2002 | Abdo et al. |
| 2002/0150804 A1 | 10/2002 | Srinivasan et al. |
| 2002/0154915 A1 | 10/2002 | Bullock et al. |
| 2002/0155335 A1 | 10/2002 | Kearl |
| 2002/0182459 A1 | 12/2002 | Hockaday et al. ............ 429/19 |
| 2002/0192537 A1 | 12/2002 | Ren |
| 2002/0197522 A1 | 12/2002 | Lawrence et al. ............ 429/34 |
| 2003/0006668 A1 | 1/2003 | Lal et al. |
| 2003/0027022 A1 | 2/2003 | Arana et al. |
| 2003/0031910 A1 | 2/2003 | Satou et al. |
| 2003/0031913 A1 | 2/2003 | Pavio et al. |
| 2003/0041899 A1 | 3/2003 | Frank |
| 2003/0057199 A1 | 3/2003 | Villa et al. |
| 2003/0064258 A1 | 4/2003 | Pan et al. |
| 2003/0077495 A1 | 4/2003 | Scartozzi et al. |
| 2003/0082416 A1 | 5/2003 | Bullock et al. |
| 2003/0082426 A1 | 5/2003 | Bullock et al. |
| 2003/0082427 A1 | 5/2003 | Prasad et al. |
| 2003/0091502 A1 | 5/2003 | Holladay et al. |
| 2003/0103878 A1 | 6/2003 | Morse et al. |
| 2003/0129464 A1 | 7/2003 | Becerra et al. |
| 2003/0131663 A1 | 7/2003 | Gore et al. |
| 2003/0134162 A1 | 7/2003 | Gore et al. |
| 2003/0136453 A1 | 7/2003 | Johnson |
| 2003/0138676 A1 | 7/2003 | Leban |
| 2003/0138679 A1 | 7/2003 | Prased et al. |
| 2003/0143444 A1 | 7/2003 | Liu et al. |
| 2003/0157389 A1 | 8/2003 | Kornmayer |
| 2003/0194363 A1 | 10/2003 | Koripella |
| 2004/0001989 A1 | 1/2004 | Kinkelaar et al. |
| 2004/0009381 A1 | 1/2004 | Sakai et al. |
| 2004/0013927 A1 | 1/2004 | Lawrence et al. |
| 2004/0043273 A1 | 3/2004 | Jankowski et al. |
| 2004/0048128 A1 | 3/2004 | Jankowski et al. |
| 2004/0062965 A1 | 4/2004 | Morse et al. |
| 2004/0081884 A1 | 4/2004 | Bean et al. |
| 2004/0086755 A1 | 5/2004 | Kalal |
| 2004/0096714 A1 | 5/2004 | Bette et al. |
| 2004/0096721 A1 | 5/2004 | Ohlsen et al. ................ 429/34 |
| 2004/0146769 A1 | 7/2004 | Birschbach |
| 2004/0151962 A1 | 8/2004 | Adams |
| 2004/0166385 A1 | 8/2004 | Morse et al. |
| 2004/0166395 A1 | 8/2004 | Jankowski et al. |
| 2004/0173615 A1 | 9/2004 | Goodman |
| 2004/0175598 A1 | 9/2004 | Bliven et al. |
| 2004/0175600 A1 | 9/2004 | Arthur et al. |
| 2004/0191588 A1 | 9/2004 | Eshraghi et al. ............. 429/19 |
| 2004/0209142 A1 | 10/2004 | Becerra et al. |
| 2004/0211054 A1 | 10/2004 | Morse et al. |
| 2004/0229101 A1 | 11/2004 | Davis |
| 2004/0234826 A1 | 11/2004 | Stuhler |
| 2004/0241521 A1 | 12/2004 | Finkelshtain et al. |
| 2004/0253500 A1 | 12/2004 | Bourilkov et al. |
| 2004/0265650 A1 | 12/2004 | Koo |
| 2004/0265652 A1 | 12/2004 | Soucy |
| 2005/0008909 A1 | 1/2005 | Kaye et al. |
| 2005/0011125 A1 | 1/2005 | Kaye et al. |
| 2005/0014040 A1 | 1/2005 | Kaye |
| 2005/0014041 A1 | 1/2005 | Becerra et al. |
| 2005/0014059 A1 | 1/2005 | Kaye |
| 2005/0022883 A1 | 2/2005 | Adams et al. |
| 2005/0023236 A1 | 2/2005 | Adams et al. |
| 2005/0058879 A1 | 3/2005 | Guay |
| 2005/0074643 A1 | 4/2005 | Adams et al. |
| 2005/0095500 A1 | 5/2005 | Corless et al. |
| 2005/0115637 A1 | 6/2005 | Adams et al. |
| 2005/0115882 A1 | 6/2005 | Curello et al. |
| 2005/0116190 A1 | 6/2005 | Adams et al. |
| 2005/0118468 A1 | 6/2005 | Adams et al. |
| 2005/0147864 A1 | 7/2005 | Eggum |
| 2005/0155668 A1 | 7/2005 | Finkelshtain et al. |

FOREIGN PATENT DOCUMENTS

| | | |
|---|---|---|
| JP | 2003017102 | 1/2003 |
| JP | 2003-049996 | 2/2003 |
| KR | 2005041265 | 5/2005 |
| WO | WO 00/45457 | 8/2000 |
| WO | WO 02/059993 | 8/2002 |
| WO | WO 02/093665 | 11/2002 |
| WO | WO 02/103832 | 12/2002 |
| WO | WO 02/103878 | 12/2002 |
| WO | WO 03/012902 | 2/2003 |
| WO | WO 2004/030805 | 4/2004 |

OTHER PUBLICATIONS

A.R. Boccaccini et al., "Electrophoretic Deposition of Nanoceramic Particles onto Electrically Conducting Fibre Fabrics", Sep. 21-24, 1998, 43rd International Scientific Colloquium, Technical University of Ilmenau.

J. Bostaph et al., "1W Direct Methanol Fuel Cell System as a Desktop Charger", Oct. 14, 2002, Motorola Labs, Tempe, AZ.

K. Brooks et al., "Microchannel Fuel Processing, Fuel Cells for Transportation/Fuels for Fuel Cells", May 6-10, 2002, 2002 Annual Program/Lab R&D Review, Pacific Northwest National Laboratory.

M.J. Castaldi et al., "A Compact, Lightweight, Fast-Response Preferential Oxidation Reactor for PEM Automotive Fuel Cell Applications", Sep. 6, 2002, Precision Combustion, Inc., North Haven, CT.

S. Ehrenberg et al., "One Piece Bi-Polar (OPB) Plate with Cold Plate Cooling", Dec. 13, 2002, Session PEM R&D II (2A), Dais Analytic—Rogers.

J.D. Holladay et al., "Miniature Fuel Processors for Portable Fuel Cell Power Supplies", Nov. 26, 2002, Battelle Pacific Northwest Division, Richland, WA.

S.W. Janson et al., "MEMS, Microengineering and Aerospace Systems", 1999, The American Institute of Aeronautics and Astronautics, Inc.

J. Kaschmitter et al., "Micro-Fabricated Methnol/Water Reformers for Small PEM Fuel Cell Systems", Jul. 21-24, 2003, 8th Electrochemical Power Sources R&D Symposium, Portsmouth, VA.

K. Keegan et al., "Analysis for a Planar Solid Oxide Fuel Cell Based Automotive Auxiliary Power Unit", Mar. 4-7, 2002, SAE 2002 World Congress, Detroit, MI.

K. Kempa et al., "Photonic Crystals Based on Periodic Arrays of Aligned Carbon Nanotubes", Oct. 3, 2002, Nano Letters 2003, vol. 3. No. 1, 13-18.

R. Kumar et al., "Soild Oxide Fuel Cell Research at Argonne National Laboratory", Mar. 29-30, 2001, 2nd Solid Sate Energy Conversion Alliance Workshop, Arlington, VA.

S.H. Lee et al., "Removal of Carbon Monoxide from Reformate for Polymer Electrolyte Fuel Cell Application", Nov. 16-19, 1998, 1998 Fuel Cell Seminar, Palm Springs, CA.

Q. Li et al., "The CO Poisoning Effect in PEMFCs Operational at Temperatures up to 200° C.", 2003, Journal of The Electrochemical Society, 150 (12) A1599-A1605.

D. Myers et al., "Alternative Water-Gas Shift Catalysts", Jun. 7-8, 2000, 2000 Annual National Laboratory R&D Meeting, DOE Fuel Cells for Transportation Program, Argonne National Laboratory.

D.R. Palo et al., "Development of a Soldier-Portable Fuel Cell Power System, Part I: A Bread-Board Methanol Fuel Processor", 2002, Journal of Power Sources 108 (2002) 28-34.

A. Pattekar et al., "A Microreactor for In-situ Hydrogen Production by Catalytic Methnol Reforming", May 27-30, 2001, Proceedings of the 5th International Conference on Microreaction Technology.

A. Pattekar et al., "Novel Microfluidic Interconnectors for High Temperature and Pressure Applications", 2003, Journal of Micromechanics and Microengineering, 13, 337-345.

A.J. Franz et al., "High Temperature Gas Phase Catalytic and Membrane Reactors", Jun. 1999, Massachusetts Institute of Technology, Cambridge, MA.

D. Prater et al., "Systematic Examination of a Direct Methonal-Hydrogen Peroxide Fuel Cell", Sep. 22, 2001, Swift Enterprises, Ltd., Lafayette, IN.

W. Ruettinger et al., "A New Generation of Water Gas Shift Catalysts for Fuel Cell Applications", 2003, Journal of Power Sources, 118, 61-65.

O. Savadogo et al., Hydrogen/Oxygen Polymer Electrolyte Membrane Fuel Cell (PEMFC) Based on Acid-Doped Polybenzimidazole (PBI), 2000, Journal of New Materials for Electrochemical Systems, 3, 345-349.

R.F. Savinell et al., "High Temperature Polymer Electrolyte for PEM Fuel Cells", Sep. 4, 2002, Department of Chemical Engineering, Case Western Reserve University.

R. Srinivasan et al., "Micromachined Reactors for Catalytic Partial Oxidation Reactions", Nov. 1997, AIChe Journal, vol. 43, No. 11, 3059-3069.

S. Swartz et al., "Ceria-Based Water-Gas-Shift Catalysts", Aug. 1, 2003, NexTech Materials, Ltd., Wolrthington, OH.

S. Tasic et al., "Multilayer Ceramic Processing of Microreactor Systems", Oct. 14, 2002, Motorola Labs, Tempe, AZ.

V. Tomašić et al., "Development of the Structured Catalysts for the Exhaust Gas Treatment", 2001, Chem. Biochem. Eng. Q. 15 (3), 109-115.

Tiax LLC, "Advanced Hydrogen Storage: A System's Perspective and Some Thoughts on Fundamentals", Aug. 14-15, 2002, Presentation for DOE Workshop on Hydrogen Storage, Cambridge, MA.

Wan et al., "Catalyst Preparation: Catalytic Converter", Feb. 19, 2003, www.insightcentral.net/encatalytic.html.

J. Zalc et al., "Are Noble Metal-Based Water-Gas Shift Catalysts Practical for Automotive Fuel Processing?", 2002, Journal of Catalysis, 206, 169-171.

J. Zizelman et al., "Solid-Oxide Fuel Cell Auxiliary Power Unit: A Paradigm Shift in Electric Supply for Transportation", 2000, Delphi Automotive Systems.

"Methanol-Powered Laptops—Cleared for Take-Off", www.silicon.com, Oct. 7, 2002.

Melissa Funk, "Methanol Fuel Quality Specification Study for Proton Exchange Membrane Fuel Cells, Final Report", XCELLSIS, Feb. 2002, 65 pages.

Dr. Detlef zur Megede et al., "MFCA Research Document, Complete", Methanol Fuel Cell Alliance, Sep. 2000, 242 pages.

International Search Report, related to U.S. Appl. No. 10/877,766, dated Mar. 28, 2005.

FIG. 2D  FIG. 2E

FUEL CELL CARTRIDGE FILTERS AND PRESSURE RELIEF

CROSS-REFERENCE TO RELATED APPLICATIONS

This application is a divisional of and claims priority under U.S.C. §120 from co-pending U.S. patent application Ser. No. 10/877,766, filed Jun. 25, 2004 and entitled, "PORTABLE FUEL CARTRIDGE FOR FUEL CELLS", which is incorporated herein for all purposes and which claims priority under 35 U.S.C. §119(e) from: a) U.S. Provisional Patent Application No. 60/482,996 filed Jun. 27, 2003 and entitled "Fuel cell system startup procedure and self-heating apparatus", which is incorporated by reference for all purposes; b) U.S. Provisional Patent Application No. 60/483,415 filed Jun. 27, 2003 and entitled "Refillable Smart Methanol Cartridge for Fuel Cells", which is incorporated by reference for all purposes; and c) U.S. Provisional Patent Application No. 60/483,416 filed Jun. 27, 2003 and entitled "Fuel Preheat in Portable Electronics Powered by Fuel Cells", which is incorporated by reference for all purposes.

BACKGROUND OF THE INVENTION

The present invention relates to fuel cell technology. In particular, the invention relates to portable fuel cell storage devices that store a fuel source, allow transportation of the fuel source, and permit coupling to electronics devices including a fuel processor that converts the fuel source to hydrogen.

A fuel cell electrochemically combines hydrogen and oxygen to produce electrical energy. The ambient air readily supplies oxygen. Hydrogen provision, however, calls for a working supply. Gaseous hydrogen has a low energy density that reduces its practicality as a portable fuel. Liquid hydrogen, which has a suitable energy density, must be stored at extremely low temperatures and high pressures, making storing and transporting liquid hydrogen burdensome.

A reformed hydrogen supply processes a fuel source to produce hydrogen. The fuel source acts as a hydrogen carrier. Currently available hydrocarbon fuel sources include methanol, ethanol, gasoline, propane and natural gas. Liquid hydrocarbon fuel sources offer high energy densities and the ability to be readily stored and transported. A fuel processor reforms the hydrocarbon fuel source to produce hydrogen.

To date, fuel cell evolution has concentrated on large-scale applications such as industrial size generators for electrical power back-up. Consumer electronics devices and other portable electrical power applications currently rely on lithium ion and similar battery technologies. Portable fuel source storage devices that service portable electronics such as laptop computers would be desirable but are not yet commercially available.

SUMMARY OF THE INVENTION

The present invention relates to a portable storage device that stores a hydrogen fuel source. The storage device includes a bladder that contains the hydrogen fuel source and conforms to the volume of the hydrogen fuel source. A housing provides mechanical protection for the bladder. The storage device also includes a connector that interfaces with a mating connector to permit transfer of the fuel source between the bladder and a device that includes the mating connector. The device may be a portable electronics device such as a laptop computer. A digital, electrical or mechanical means of identifying and updating information relevant to usage of the storage device may also be employed.

Refillable hydrogen fuel source storage devices are also provided. A hydrogen fuel source refiller includes the mating connector and fills the storage device with hydrogen fuel source.

In a fuel cell system that receives the hydrogen fuel source from the storage device, a fuel processor may reform the hydrogen fuel source to produce hydrogen, and then provides the hydrogen to a fuel cell that generates electricity using the hydrogen.

Hot swappable fuel storage systems described herein allow a portable hydrogen fuel source storage device to be removed from a fuel processor or electronics device it provides the hydrogen fuel source to, without shutting down the receiving device or without compromising hydrogen fuel source provision to the receiving device for a limited time. The hot swappable system comprises a reserve that provides the hydrogen fuel source to the receiving device. The reserve includes a volume that stores the hydrogen fuel source when the connector and mating connector are separated.

In one aspect, the present invention relates to a storage device for storing a hydrogen fuel source. The storage device comprises a bladder that contains the hydrogen fuel source and conforms to the volume of the hydrogen fuel source in the bladder. The storage device also comprises a housing that provides mechanical protection for the bladder. The storage device further comprises a connector that interfaces with a mating connector to permit transfer of the fuel source between the bladder and a device that includes the mating connector. The storage device additionally comprises memory that stores information relevant to usage of the storage device.

In another aspect, the present invention relates to a storage device for storing a hydrogen fuel source. The storage device comprises a bladder that contains the hydrogen fuel source and conforms to the volume of the hydrogen fuel source in the bladder. The storage device also comprises a housing that provides mechanical protection for the bladder. The storage device further comprises a connector that interfaces with a mating connector included in a hydrogen fuel source refiner to permit transfer of the hydrogen fuel source from the hydrogen fuel source refiner to the bladder.

In yet another aspect, the present invention relates to a hot swappable fuel storage system. The hot swappable system comprises a hydrogen fuel source storage device. The storage device includes a) a bladder that contains the hydrogen fuel source and conforms to the volume of the hydrogen fuel source in the bladder, b) a housing that provides mechanical protection for the bladder; and c) a connector. The hot swappable system also comprises a mating connector that interfaces with the connector to permit transfer of the hydrogen fuel source between the storage device and a device that includes the mating connector. The hot swappable system further comprises a fuel processor that includes a reformer configured to receive the hydrogen fuel source from the mating connector, configured to output hydrogen, and including a catalyst that facilitates the production of hydrogen. The hot swappable system additionally comprises a hot swappable reserve configured to store the hydrogen fuel source when the connector and mating connector are separated.

In still another aspect, the present invention relates to system for providing a refillable hydrogen fuel source storage device. The system comprises a hydrogen fuel source storage device. The storage device includes a) a bladder that contains the hydrogen fuel source and conforms to the volume of the hydrogen fuel source in the bladder, b) a housing that provides mechanical protection for the bladder; and c) a connector that interfaces with a mating connector to permit transfer of the hydrogen fuel source between the bladder and a device that includes the mating connector. The system also comprises a hydrogen fuel source refiner including the mating connector and configured to provide hydrogen fuel source to the storage device when the connector is coupled to the mating connector.

In another aspect, the present invention relates to a fuel cell system for producing electrical energy. The fuel cell system comprises a hydrogen fuel source storage device for storing a hydrogen fuel source. The storage device includes a bladder that contains the hydrogen fuel source and conforms to the volume of the hydrogen fuel source in the bladder. The storage device also includes a housing that provides mechanical protection for the bladder. The storage device further includes a memory that stores information relevant to usage of the storage device. The storage device additionally includes a connector that interfaces with a mating connector to permit transfer of the hydrogen fuel source between the bladder and a device that includes the mating connector. The fuel cell system also comprises a fuel processor. The fuel processor includes a reformer configured to receive the hydrogen fuel source from the mating connector, configured to output hydrogen, and including a catalyst that facilitates the production of hydrogen. The fuel processor also includes a burner configured to provide heat to the reformer. The fuel cell system also comprises a fuel cell including a fuel cell stack configured to produce electrical energy using hydrogen output by the fuel processor.

These and other features and advantages of the present invention will be described in the following description of the invention and associated figures.

BRIEF DESCRIPTION OF THE DRAWINGS

FIG. 2D illustrates a front view of a fuel source storage device in accordance with one embodiment of the present invention.

FIG. 2E illustrates a front view of a storage device that is compatible with the storage device of FIG. 2D in accordance with another embodiment of the present invention.

DETAILED DESCRIPTION OF THE PREFERRED EMBODIMENTS

The present invention is described in detail with reference to a few preferred embodiments as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Figure 1A:
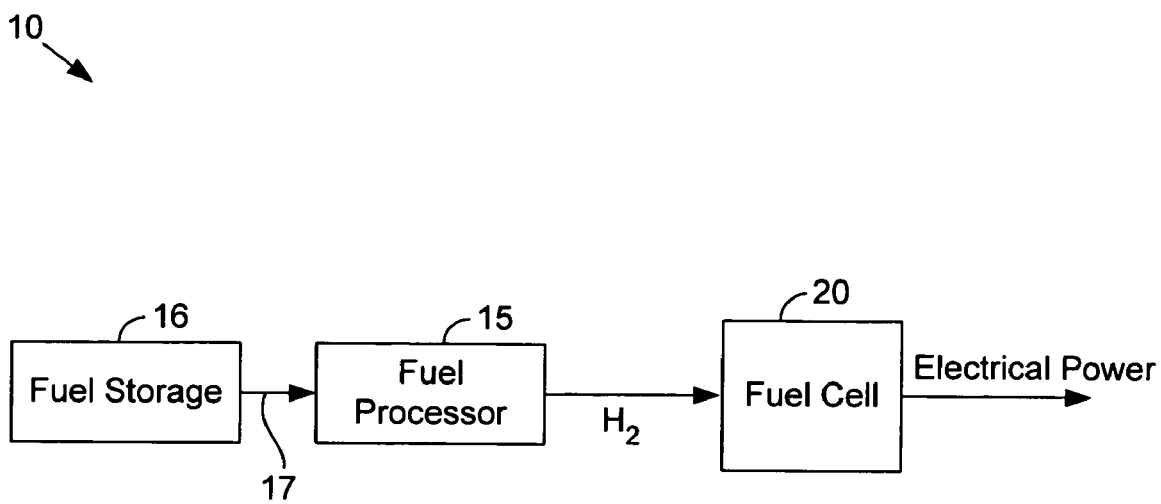
FIG. 1A illustrates a fuel cell system for producing electrical energy in accordance with one embodiment of the present invention.

FIG. 1A illustrates a fuel cell system 10 for producing electrical energy in accordance with one embodiment of the present invention. Fuel cell system 10 comprises storage device 16, fuel processor 15 and fuel cell 20.

Storage device 16 and fuel processor 15 provide hydrogen to fuel cell 20. Storage device 16 and fuel processor 15 collectively act as a "reformed" hydrogen supply that processes a hydrogen fuel source 17 to produce hydrogen. Hydrogen fuel source 17 acts as a carrier for hydrogen and can be processed to separate hydrogen. Hydrogen fuel source 17 may include any hydrogen bearing fuel stream, aliphatic fuel source or other hydrogen carrier such as ammonia. Currently available hydrocarbon fuel sources 17 suitable for use with the present invention include methanol, ethanol, gasoline, propane, butane and natural gas, for example. Several hydrocarbon and ammonia products may also produce a suitable fuel source 17. Liquid fuel sources 17 offer high energy densities and the ability to be readily stored and shipped.

Storage device 16 stores fuel source 17, and may comprise a refillable and/or disposable fuel cartridge. A refillable cartridge offers a user instant recharging. In one embodiment, the cartridge includes a collapsible bladder within a hard plastic case. Storage device 16 is portable and described in further detail below.

A separate fuel pump typically controls fuel source 17 flow from storage device 16. If system 10 is load following, then a control system meters fuel source 17 to deliver fuel source 17 to processor 15 at a flow rate determined by the required power level output of fuel cell 20.

Fuel processor 15 processes the hydrocarbon fuel source 17 and outputs hydrogen. A hydrocarbon fuel processor 15 heats and processes a hydrocarbon fuel source 17 in the presence of a catalyst to produce hydrogen. Fuel processor 15 comprises a reformer, which is a catalytic device that converts a liquid or gaseous hydrocarbon fuel source 17 into hydrogen and carbon dioxide. As the term is used herein, reforming refers to the process of producing hydrogen from a fuel source.

Fuel cell 20 electrochemically converts hydrogen and oxygen to water, generating electrical energy and heat in the process. Ambient air commonly supplies oxygen for fuel cell 20. A pure or direct oxygen source may also be used for oxygen supply. The water often forms as a vapor, depending on the temperature of fuel cell 20 components. The electrochemical reaction also produces carbon dioxide as a byproduct for many fuel cells.

In one embodiment, fuel cell 20 is a low volume polymer electrolyte membrane (PEM) fuel cell suitable for use with portable applications such as consumer electronics. A polymer electrolyte membrane fuel cell comprises a membrane electrode assembly 40 that carries out the electrical energy generating electrochemical reaction. The membrane electrode assembly 40 includes a hydrogen catalyst, an oxygen catalyst and an ion conductive membrane that a) selectively conducts protons and b) electrically isolates the hydrogen catalyst from the oxygen catalyst. A hydrogen gas distribution layer contains the hydrogen catalyst and allows the diffusion of hydrogen therethrough. An oxygen gas distribution layer contains the oxygen catalyst and allows the diffusion of oxygen and hydrogen protons therethrough. The ion conductive membrane separates the hydrogen and oxygen gas distribution layers. In chemical terms, the anode comprises the hydrogen gas distribution layer and hydrogen catalyst, while the cathode comprises the oxygen gas distribution layer and oxygen catalyst.

A PEM fuel cell often includes a fuel cell stack having a set of bi-polar plates. A membrane electrode assembly is disposed between two bi-polar plates. Hydrogen distribution 43 occurs via a channel field on one plate while oxygen distribution 45 occurs via a channel field on a second facing plate. Specifically, a first channel field distributes hydrogen to the hydrogen gas distribution layer, while a second channel field distributes oxygen to the oxygen gas distribution layer. The term "bi-polar" refers electrically to a bi-polar plate (whether comprised of one plate or two plates) sandwiched between two membrane electrode assembly layers. In this case, the bi-polar plate acts as both a negative terminal for one adjacent membrane electrode assembly and a positive terminal for a second adjacent membrane electrode assembly arranged on the opposite face of the bi-polar plate.

In electrical terms, the anode includes the hydrogen gas distribution layer, hydrogen catalyst and bi-polar plate. The anode acts as the negative electrode for fuel cell 20 and conducts electrons that are freed from hydrogen molecules so that they can be used externally, e.g., to power an external circuit. In a fuel cell stack, the bi-polar plates are connected in series to add the potential gained in each layer of the stack. In electrical terms, the cathode includes the oxygen gas distribution layer, oxygen catalyst and bi-polar plate. The cathode represents the positive electrode for fuel cell 20 and conducts the electrons back from the external electrical circuit to the oxygen catalyst, where they can recombine with hydrogen ions and oxygen to form water.

The hydrogen catalyst separates the hydrogen into protons and electrons. The ion conductive membrane blocks the electrons, and electrically isolates the chemical anode (hydrogen gas distribution layer and hydrogen catalyst) from the chemical cathode. The ion conductive membrane also selectively conducts positively charged ions. Electrically, the anode conducts electrons to a load (electrical energy is produced) or battery (energy is stored). Meanwhile, protons move through the ion conductive membrane. The protons and used electrons subsequently meet on the cathode side, and combine with oxygen to form water. The oxygen catalyst in the oxygen gas distribution layer facilitates this reaction. One common oxygen catalyst comprises platinum powder very thinly coated onto a carbon paper or cloth. Many designs employ a rough and porous catalyst to increase surface area of the platinum exposed to the hydrogen and oxygen.

In one embodiment, fuel cell 20 comprises a set of bi-polar plates formed from a single plate. Each plate includes channel fields on opposite faces of the plate. Since the electrical generation process in fuel cell 20 is exothermic, fuel cell 20 may implement a thermal management system to dissipate heat from the fuel cell. Further description of a fuel cell suitable for use with the present invention is included in commonly owned co-pending patent application entitled "Micro Fuel Cell Architecture" naming Ian Kaye as inventor and filed on Jun. 25, 2004, which is incorporated by reference for all purposes.

While the present invention will mainly be discussed with respect to PEM fuel cells, it is understood that the present invention may be practiced with other fuel cell architectures. The main difference between fuel cell architectures is the type of ion conductive membrane used. In one embodiment, fuel cell 20 is phosphoric acid fuel cell that employs liquid phosphoric acid for ion exchange. Solid oxide fuel cells employ a hard, non-porous ceramic compound for ion exchange and may be suitable for use with the present invention. Generally, any fuel cell architecture may benefit from the fuel storage improvements described herein. Other such fuel cell architectures include direct methanol, alkaline and molten carbonate fuel cells.

Fuel cell 20 generates dc voltage that may be used in a wide variety of applications. For example, electrical energy generated by fuel cell 20 may be used to power a motor or light. In one embodiment, the present invention provides "small" fuel cells that are configured to output less than 200 watts of power (net or total). Fuel cells of this size are commonly referred to as "micro fuel cells" and are well suited for use with portable electronics devices. In one embodiment, fuel cell 20 is configured to generate from about 1 milliwatt to about 200 watts. In another embodiment, fuel cell 20 generates from about 3 W to about 20 W. Fuel cell 20 may also be a stand-alone fuel cell, which is a single unit that produces power as long as it has an a) oxygen and b) hydrogen or a hydrocarbon fuel supply. A stand-alone fuel cell 20 that outputs from about 40 W to about 100 W is well suited for use in a laptop computer.

In one embodiment, fuel processor 15 is a steam reformer that only needs steam and the fuel source 17 to produce hydrogen. Several types of reformers suitable for use in fuel cell system 10 include steam reformers, auto thermal reformers (ATR) or catalytic partial oxidizers (CPOX). ATR and CPOX reformers mix air with the fuel and steam mix. ATR and CPOX systems reform fuels such as methanol, diesel, regular unleaded gasoline and other hydrocarbons. In a specific embodiment, storage device 16 provides methanol 17 to fuel processor 15, which reforms the methanol at about 250° C. or less and allows fuel cell system 10 use in applications where temperature is to be minimized. Further description of a fuel processor suitable for use with the present invention is included in commonly owned co-pending patent application entitled "Efficient Micro Fuel Cell Systems and Methods" naming Ian Kaye as inventor and filed on Jun. 25, 2004, which is incorporated by reference for all purposes.

Figure 1B:
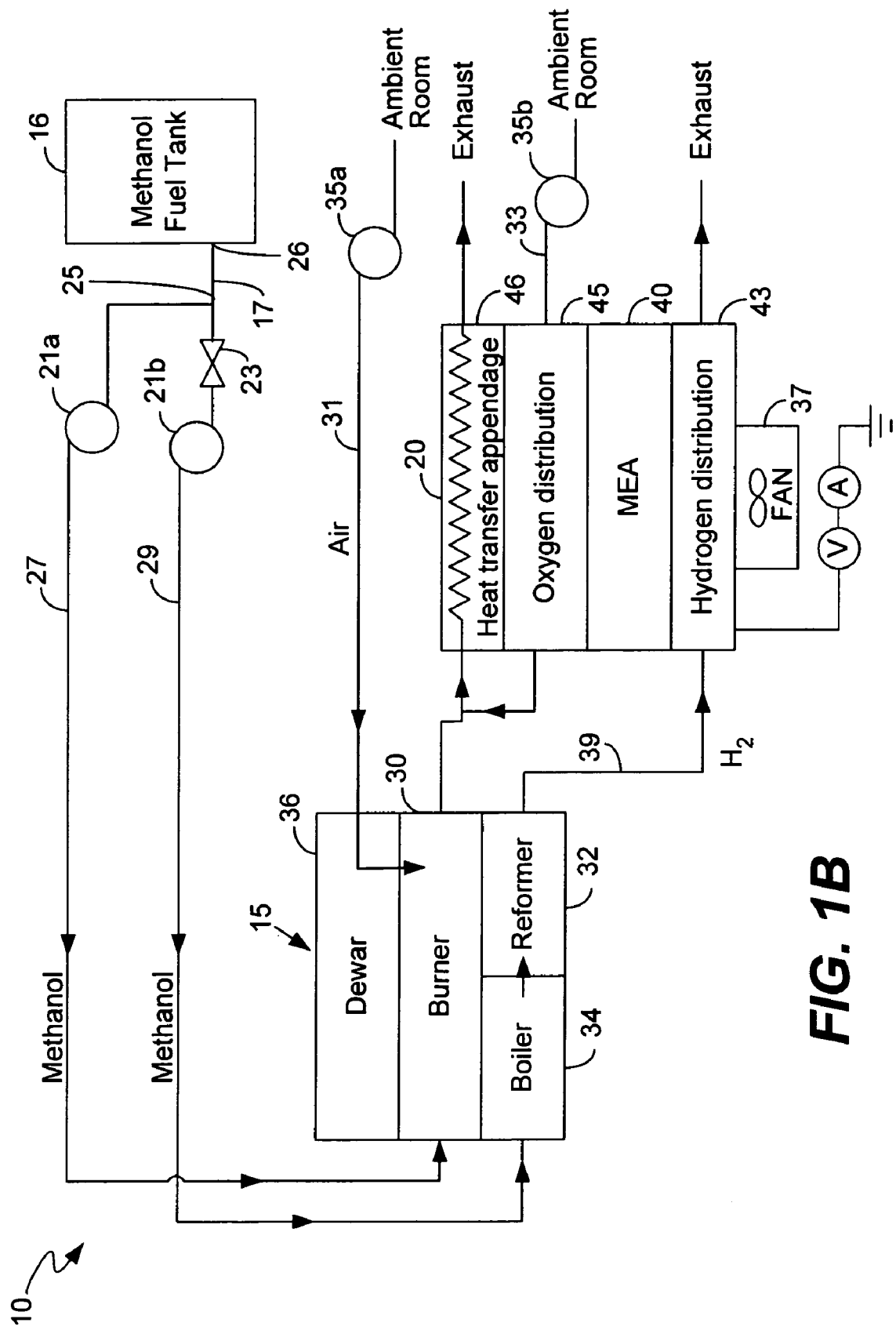
FIG. 1B illustrates schematic operation for the fuel cell system of FIG. 1A in accordance with a specific embodiment of the present invention.

FIG. 1B illustrates schematic operation for fuel cell system 10 in accordance with a specific embodiment of the present invention. As shown, fuel cell system 10 comprises hydrogen fuel source storage device 16, hydrogen fuel source 17, fuel processor 15, fuel cell 20, multiple pumps 21 and fans 35, fuel lines and gas lines, and one or more valves 23.

Fuel container 16 stores methanol as a hydrogen fuel source 17. An outlet 26 of fuel container 16 provides methanol 17 into hydrogen fuel source line 25. As shown, line 25 divides into two lines: a first line 27 that transports methanol 17 to a burner 30 for fuel processor 15 and a second line 29 that transports methanol 17 to reformer 32 in fuel processor 15. Lines 25, 27 and 29 may comprise plastic tubing, for example. Separate pumps 21a and 21b are provided for lines 27 and 29, respectively, to pressurize the lines and transmit the fuel source at independent rates if desired. A model P625 pump as provided by Instech of Plymouth Meeting, PA is suitable to transmit liquid methanol for system 10 is suitable in this embodiment. A flow sensor or valve 23 situated on line 29 between storage device 16 and fuel processor 15 detects and communicates the amount of methanol 17 transfer between storage device 16 and reformer 32. In conjunction with the sensor or valve 23 and suitable control, such as digital control applied by a processor that implements instructions from stored software, pump 21b regulates methanol 17 provision from storage device 16 to reformer 32.

Fan 35a delivers oxygen and air from the ambient room through line 31 to regenerator 36 of fuel processor 15. Fan 35b delivers oxygen and air from the ambient room through line 33 to regenerator 36 of fuel processor 15. In this embodiment, a model AD2005DX-K70 fan as provided by Adda USA of California is suitable to transmit oxygen and air for fuel cell system 10. A fan 37 blows cooling air over fuel cell 20 and its heat transfer appendages 46.

Fuel processor 15 receives methanol 17 from storage device 16 and outputs hydrogen. Fuel processor 15 comprises burner 30, reformer 32 and boiler 34. Burner 30 includes an inlet that receives methanol 17 from line 27 and a catalyst that generates heat with methanol presence. Boiler 34 includes an inlet that receives methanol 17 from line 29. The structure of boiler 34 permits heat produced in burner 30 to heat methanol 17 in boiler 34 before reformer 32 receives the methanol 17. Boiler 34 includes an outlet that provides heated methanol 17 to reformer 32. Reformer 32 includes an inlet that receives heated methanol 17 from boiler 34. A catalyst in reformer 32 reacts with the methanol 17 and produces hydrogen and carbon dioxide. This reaction is slightly endothermic and draws heat from burner 30. A hydrogen outlet of reformer 32 outputs hydrogen to line 39. In one embodiment, fuel processor 15 also includes a preferential oxidizer that intercepts reformer 32 hydrogen exhaust and decreases the amount of carbon monoxide in the exhaust. The preferential oxidizer employs oxygen from an air inlet to the preferential oxidizer and a catalyst, such as ruthenium or platinum, that is preferential to carbon monoxide over carbon dioxide.

Fuel processor may also include a dewar 36 that pre-heats air before the air enters burner 30. The dewar also reduces heat loss from fuel cell 20 by heating the incoming air before it escapes fuel processor 15. In one sense, dewar acts as a regenerator that uses waist heat in fuel processor 15 to increase thermal management and thermal efficiency of the fuel processor. Specifically, waist heat from burner 30 may be used to pre-heat incoming air provided to burner 30 to reduce heat transfer to the air in the burner so more heat transfers to reformer 32.

Line 39 transports hydrogen from fuel processor 15 to fuel cell 20. Gaseous delivery lines 31, 33 and 39 may comprise plastic tubing, for example. A hydrogen flow sensor (not shown) may also be added on line 39 to detect and communicate the amount of hydrogen being delivered to fuel cell 20. In conjunction with the hydrogen flow sensor and suitable control, such as digital control applied by a processor that implements instructions from stored software, fuel processor 15 regulates hydrogen gas provision to fuel cell 20.

Fuel cell 20 includes a hydrogen inlet port that receives hydrogen from line 39 and delivers it to a hydrogen intake manifold for delivery to one or more bi-polar plates and their hydrogen distribution channels 43. An oxygen inlet port of fuel cell 20 receives oxygen from line 33 and delivers it to an oxygen intake manifold for delivery to one or more bi-polar plates and their oxygen distribution channels 45. An anode exhaust manifold collects gases from the hydrogen distribution channels 43 and delivers them to an anode exhaust port, which outlets the exhaust gases into the ambient room. A cathode exhaust manifold collects gases from the oxygen distribution channels 45 and delivers them to a cathode exhaust port.

In addition to the components shown in shown in FIG. 1B, system 10 may also include other elements such as electronic controls, additional pumps and valves, added system sensors, manifolds, heat exchangers and electrical interconnects useful for carrying out functionality of a fuel cell system 10 that are known to one of skill in the art and omitted herein for sake of brevity.

Figure 2A:
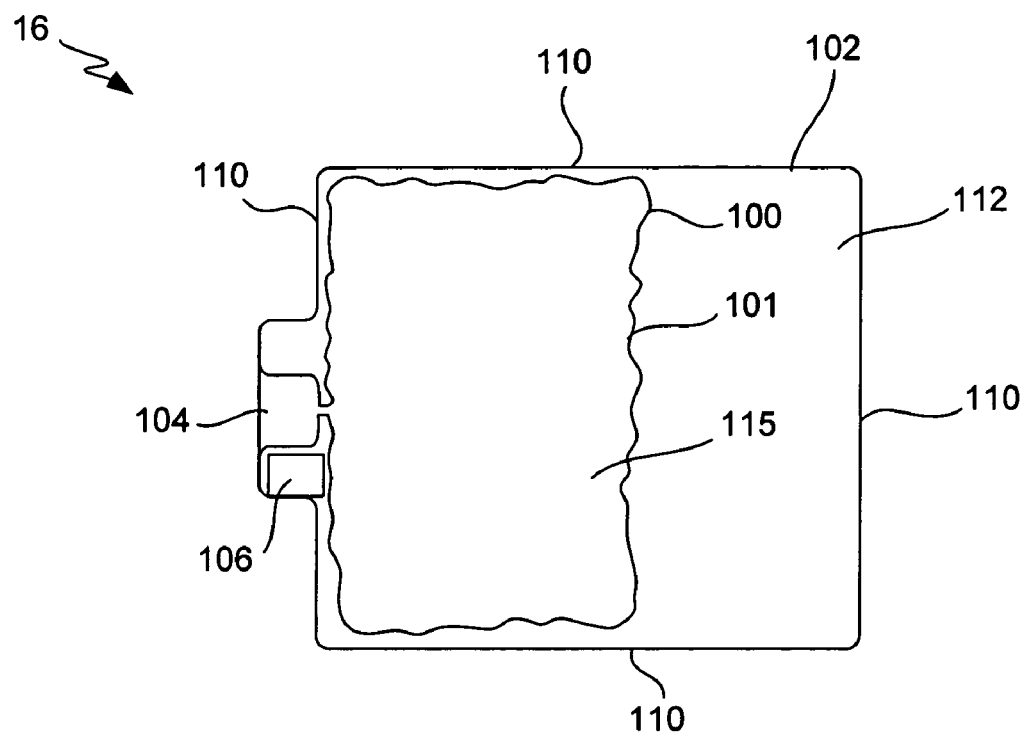
FIG. 2A shows a simplified hydrogen fuel source storage device in accordance with one embodiment of the present invention.
Figure 2C:
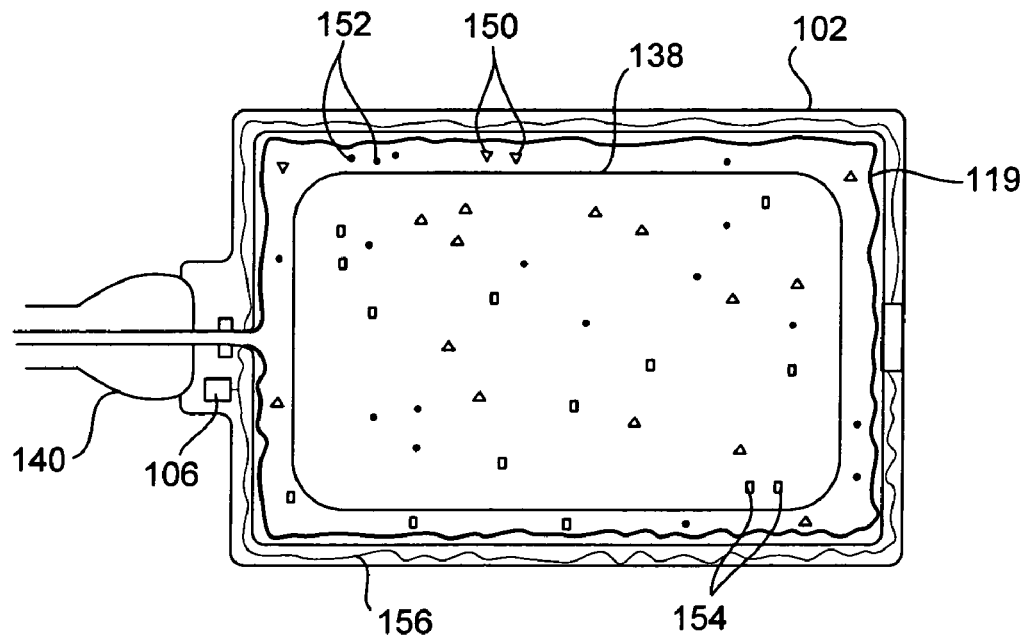
FIG. 2C illustrates a bellows configuration used in the storage device of FIG. 2B at its maximum volume.
Figure 2B:
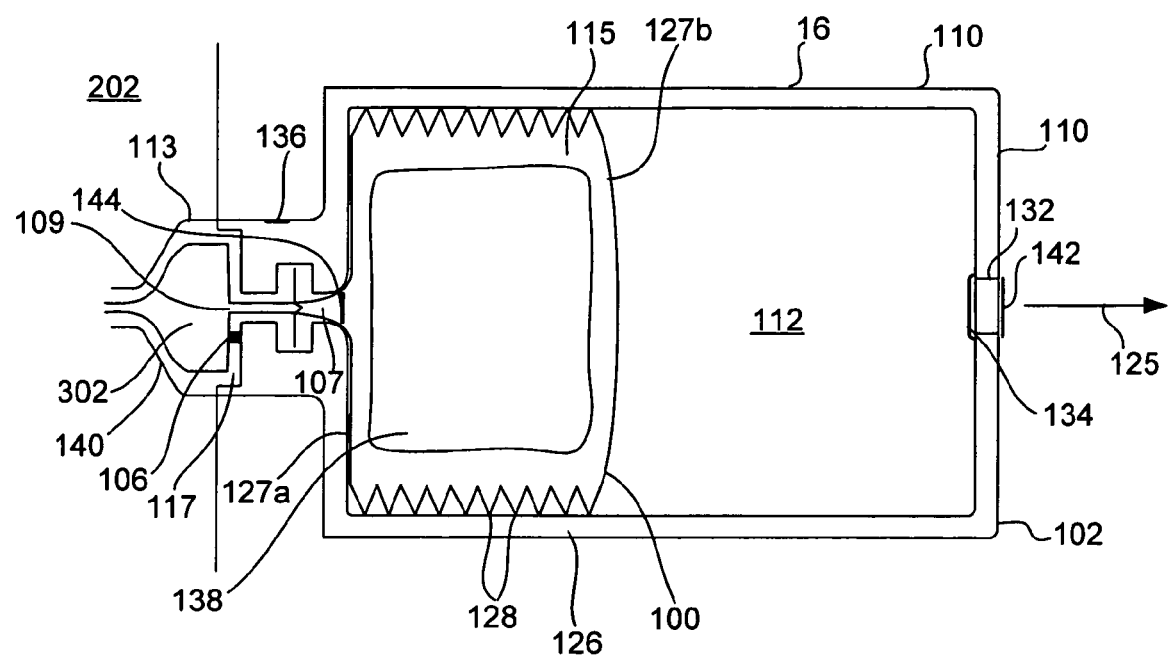
FIG. 2B illustrates a cross sectional view of a hydrogen fuel source storage device in accordance with another embodiment of the present invention.

FIG. 2A shows a simplified hydrogen fuel source storage device 16 in accordance with one embodiment of the present invention. FIG. 2B illustrates a cross sectional view of a storage device 16 in accordance with another embodiment of the present invention. Referring initially to FIG. 2A, hydrogen fuel source storage device 16 comprises a bladder 100, housing 102, connector 104 and memory 106.

Bladder 100 contains the hydrogen fuel source 17 and conforms to the volume of the hydrogen fuel source in the bladder. In one embodiment, bladder 100 comprises a compliant structure that mechanically assumes a volume 115 according to a volume of liquid stored therein. The volume 115 is formed by compliant walls 101 of bladder 100, which expand and/or open when fluid is added to bladder 100, and contract and/or collapse when fluid is removed according to the negative pressure developed upon fluid removal. In one embodiment, bladder 100 includes a sac that changes size and shape with the volume of liquid contained therein. Plastic, rubber, latex or a metal such as nickel are suitable materials for use with the walls 101 of bladder 100. In this case, the walls 101 are compliant and change size with a changing liquid volume 115. FIG. 2B illustrates a bellows design for bladder 100 that will be discussed in further detail below. Plastic walls 101 may also comprise a fire retardant plastic material. One suitable fire retardant plastic material for walls 101 is NFPA-701-99 Test 1 Polyethelyne as provided by Plasticare of Orange Park, Fla. In another embodiment, bladder 100 comprises a fixed cylinder and a piston that is pushed by a spring and moves in the cylinder to displace used fuel.

Bladder 100 is characterized by a maximum volume 119 when the bladder fully expands. FIG. 2C illustrates the bellows configuration used in the storage device of FIG. 2B at its maximum volume 119. In a specific embodiment, maximum volumes for bladder 100 range from about 20 milliliters to about 4 liters. Maximum volumes from about 20 milliliters to about 400 milliliters are suitable for many portable electronics applications. A maximum volume for bladder 100 of 200 milliliters is suitable for laptop computer usage. Some extended run time systems may rely on storage devices 16 having 80 liters of maximum volume. The maximum volume for bladder 100 may differ from the fuel source capacity of storage device 16. In some cases, storage device 16 comprises multiple bladders 100 that each contributes a maximum volume that cumulatively add to a total fuel source capacity for storage device 16. For example, a spare storage device 16 intended for electronics power back-up may contain two bladders 100 each including 300 milliliters of hydrogen fuel source 17.

While the present invention primarily refers to the storage of methanol in bladder 100 and storage device 16, it is understood that bladder 100 and storage device 16 may contain other hydrocarbon fuel sources such as those listed above. In addition, bladder 100 may contain a fuel mixture. For example, when the fuel processor 15 fed by storage device 16 comprises a steam reformer, bladder 100 may contain a fuel mixture of a hydrocarbon fuel source and water. Hydrocarbon fuel source/water fuel mixtures are often represented as a percentage fuel source in water. In one embodiment, hydrogen fuel source 17 comprises methanol or ethanol concentrations in water in the range of 1%-99.9%. Alternatively, hydrogen fuel source 17 may comprise 100% methanol or ethanol. Other liquid fuels such as butane, propane, gasoline, military grade "JP8" etc. may also be contained in storage device 16 with concentrations in water from 5-100%. In a specific embodiment, bladder 100 stores 67% methanol by volume.

Housing 102 provides mechanical protection for bladder 100 and any other components of storage device 16 included within housing 102. Housing 102 comprises a set of rigid walls 110 that contain bladder 100 and other internal components of storage device 16. In one embodiment, all components of storage device 16 are contained within housing 102 save any portions of connector 104 that protrude out of the housing for interface with mating connector 140. In another embodiment, connector 104 is recessed within housing 102 and housing 102 provides an outer shell that substantially defines outer bounds and shape of storage device 16. Walls 110 collectively form an outer case or shell for storage device 16 that mechanically separates components internal to housing 102 from the external environment. Walls 110 also collectively form an interior cavity 112. Interior cavity 112 is a space within storage device that contains bladder 100. As described below, interior cavity 112 may comprises multiple compartments, each of which include a separate bladder 100.

Rigid walls 110 may comprise a suitably stiff material such as a plastic, metal (e.g., aluminum), polycarbonate, polypropelene, carbon fiber matrix, carbon composite material, etc. Rigid walls 110 may also be formed from a fire retardant material such as a fire retardant plastic material. One suitable fire retardant plastic material for walls 110 is 8-12% weight, JLS-MC mixed with PA66 Polyamide as provided by JLS Chemical of Pomona, Calif. Rigid walls 110 may be designed according to criteria for construction of thin walled pressure vessels. Such criteria are known to those of skill in the art. In this case, walls 110 and housing 102 may be designed to withstand a maximum pressure within internal cavity 112 or for bladder 100.

Figure 2F:
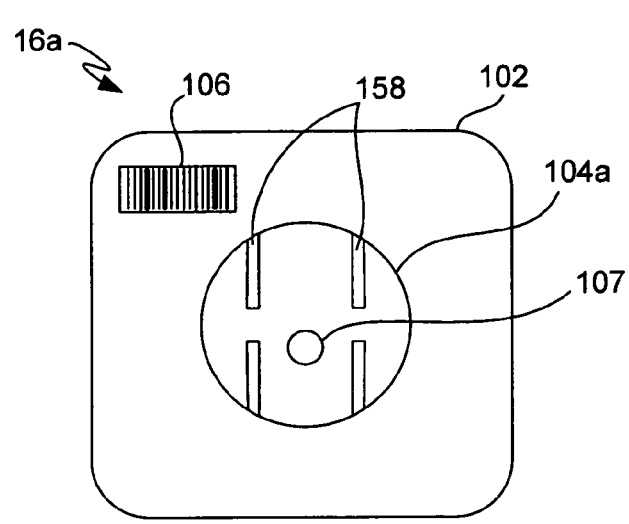
FIG. 2F illustrates a front view of a storage device that is not compatible with the storage device of FIG. 2D in accordance with one embodiment of the present invention.
Figure 2F:
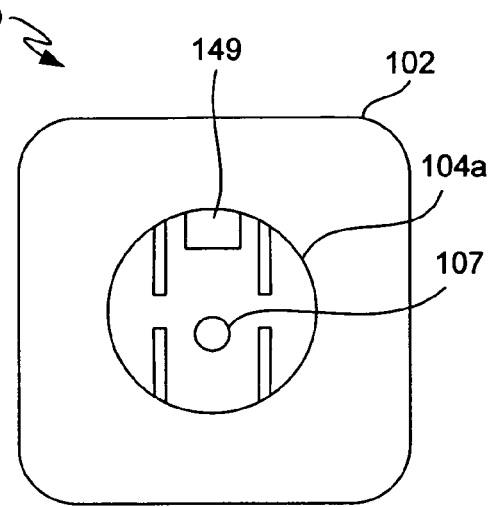
Figure 2F:
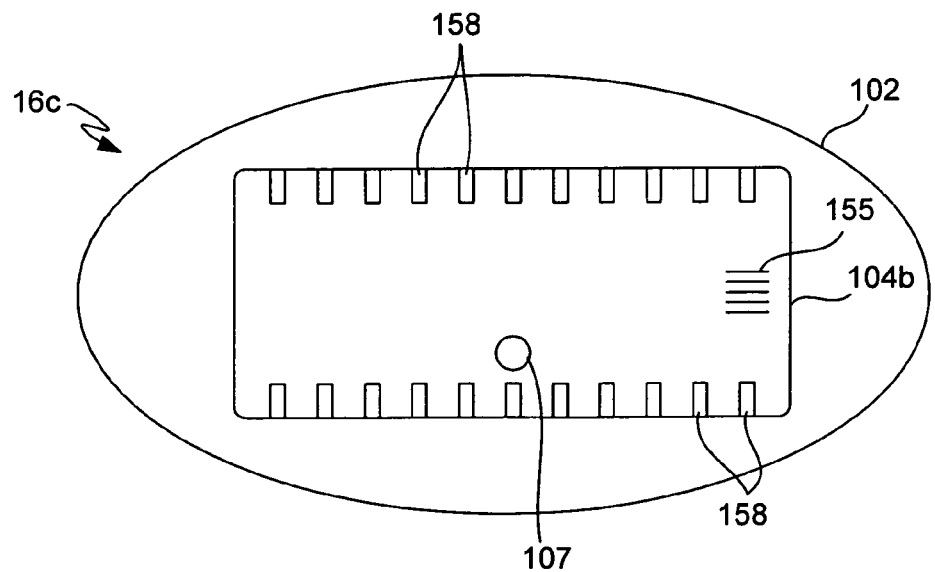

Housing 102 may include an elliptical (including circular) shape, a rectangular shape with chamfered corners, or other substantially consistent profile or shape in a given direction. FIGS. 2D-2F illustrate some suitable housing 102 shapes. For the embodiment of FIG. 2B, housing 102 includes a substantially consistent shape in a direction 125 that extends normally away from a tube 107 in connector 104. In one embodiment, housing 102 comprises a transparent section or clear window to allow for visual fuel gauging.

In one embodiment, housing 102 is integrally formed to prevent disassembly of housing 102. In this case, walls 110 may be permanently bonded or extruded from a common material in one piece such that access into housing 102 is only gained through destruction of walls 110 and housing 102.

Connector 104 interfaces with a mating connector 140 (see FIG. 2B) included in an external device. Together, connector 104 and mating connector 140 permit transfer of fuel source 17 between bladder 100 and the external device. When mating connector 140 is included in fuel processor 15 or a device that includes fuel processor 15, connector 104 and mating connector 140 interface to permit transfer of fuel source 17 from storage device 16 to the fuel processor 15. Alternatively, when mating connector 140 is included in a hydrogen fuel source refiller, connector 104 and mating connector 140 interface to permit transfer of fuel source 17 from the refiner to storage device 16. Interface between connector 104 and mating connector 140 may comprise any relationship and mating structures that permit fluid communication between the two connectors. Connector 104 and/or mating connector 140 may also include mechanical coupling to secure the interface, such as latching elements that bind connector 104 and mating connector 140 together until physically released. Connector 104 and mating connector 140 may also each include electrical leads that contact when the connectors are attached to enable electrical and digital communication.

Connector 104 and mating connector 140 each comprise a geometry that at least partially matches geometry of the other. Exemplary connector 104 and mating connector 140 geometries are described below with respect to FIGS. 2D-2G.

In one embodiment, connector 104 incorporates a quick disconnect that permits storage device 16 to be readily removed by pulling on housing 102. This separates connector 104 and mating connector 140 and detaches any electrical links and plumbing responsible for fluid communication between storage device 16 and the device including mating connector 140. A second storage device 16 with a quick disconnect connector 104 may then be readily inserted back into mating connector 140. The quick disconnect thus allows rapid replacement of storage device 16 with another storage device 16 when fuel source volume levels are low. The quick disconnect connector 104 includes one port or multiple ports according to the plumbing needs of storage device 16 (e.g., fuel provision and a scrubbing bed). A quick disconnect connector 104 may also include other features to control removal requirements such as two handed operation or a high force actuator. Commercially available quick disconnect connectors are available from a variety of vendors. One suitable quick disconnect connector is model number QDC101 as provided by Beswick of Greenland, N.H. As will be described in further detail below, storage device 16 may also include a hot swappable capability that improves quick disconnect usage for connector 104 and mating connector 140.

Connector 104 and mating connector 140 may provide an automatic shutoff capability when device 16 is removed from system 202. In this case, each only open when connected to the other and when device 16 interfaces with device 202. In one embodiment, device 16 comprises a small sponge or swab located on or near connector 104 to collect any fuel leakage during device connection or disconnect.

Figure 2G:
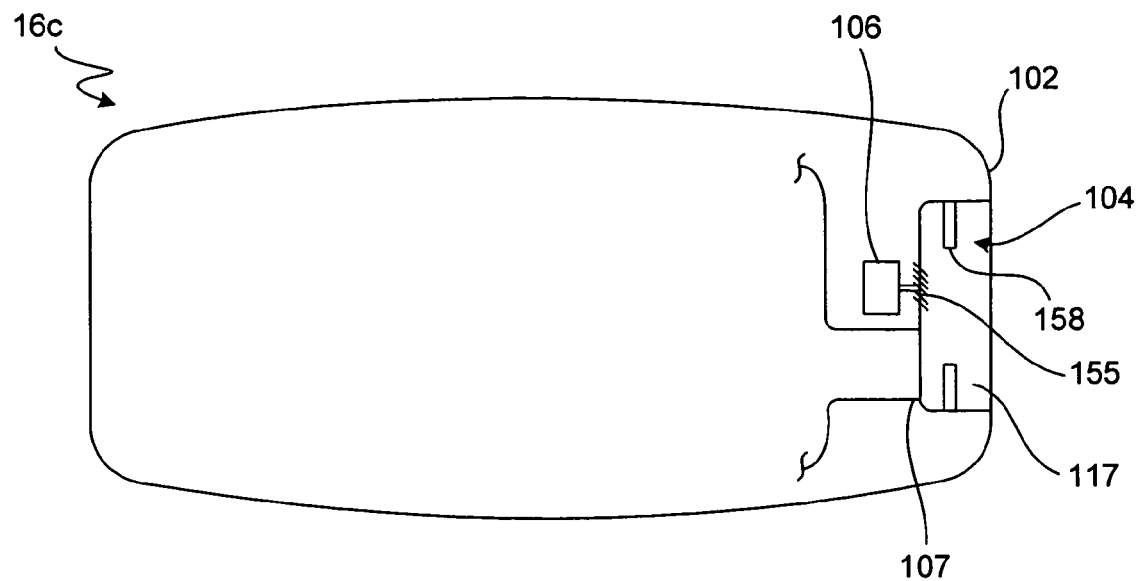
FIG. 2G illustrates a side view of the storage device of FIG. 2F.

In one embodiment, one of connector 104 and mating connector 140 includes a 'male' designation and configuration while the other includes a 'female' designation and configuration. The male configuration includes portions of the connector that protrude, such as one or more pins or electrical leads. The female configuration includes portions of the connector that receive the male portions, such as holes electrically lined to receive the male portion and facilitate electrical communication. As shown in FIG. 2G, connector 104 on storage device 16 includes a female configuration that recesses within housing 102. Since it is recessed, connector 104 cannot be knocked off during rough handling. Mating connector 140 is configured on a side portion of an OEM device (i.e., a laptop computer). As will be described in further detail below, mating connector 140 is also included in refilling hardware that refills storage device 16 with fuel source 17.

Memory 106 stores information relevant to usage of storage device 16. Memory 106 may comprise a mechanical, electrical and/or digital mechanism for information storage. In one embodiment, memory 106 comprises a digital memory source that permits an external controller to read and write from the digital memory. In another embodiment, memory 106 includes a mechanical device. One suitable mechanical device comprises "break-off" pins 158 (see FIG. 2D). Other forms of mechanical memory 106 may comprise discs or rods which are removed or otherwise manipulated every time a storage device 16 is refilled. For the embodiment shown in FIG. 2D, memory 106 is external to housing 102 and comprises a visible identification tag that uniquely identifies storage device 16. Various types of external identification tags are known in the art and may be used with this invention. Two examples of identification identifier tags include magnetic recording devices and optical bar codes.

In one embodiment, storage device 16 is considered "smart" since memory 106 stores information related to the performance, status and abilities of storage device 16. A digital memory allows an external controller or logic to read and write information relevant to usage of the storage device to memory 106. Reading from a digital memory 106 allows reception and assessment of information in memory 106 to improve usage of storage device 16. For example, a computer that receives storage device 16 may inform a user that the storage device 16 is empty or how much fuel is left (or how much time on the system is available based on its power consumption and the amount of fuel remaining). Writing to a digital memory 106 allows information in memory 106 to be updated according to storage device 16 usage. Thus, if a user nearly depletes fuel source 17 in storage device 16 while powering a computer, the next user may be informed after the first computer writes an updated amount of fuel source 17 remaining in storage device 16 into memory 106.

Storage device 16 specifications stored in memory 106 generally do not change with device 16 usage and may comprise a) a fuel type stored in the storage device when device 16 is dedicated to service a particular hydrocarbon fuel source 17, b) a model number for storage device 16, c) an identification signature for the manufacturer of storage device 16, d) manufacture date, and e) a volume capacity for bladder 100 or storage device 16. The model number of device 16 allows it to be distinguished from a number of similar devices.

Transient information stored in memory 106 that changes according to the status and usage of storage device 16 may comprise a) hydrogen fuel mixture information, b) a number of refills provided to storage device 16 when device 16 is configured for re-usable service, c) the last refill date, d) the refilling service provider that refilled storage device 16 when the device is configured for re-usable service, e) usage history according to a storage device identification, and f) a current volume for the storage device.

Referring now to FIG. 2B, storage device 16 comprises a bladder 100 with a collapsible bellows configuration 126, housing 102, connector 104, memory 106, air vent 132, filter 134, pressure relief valve 136, fire retardant foam 138, mechanical shield 142, and fuel source filter 144. Connector 104 comprises tube 107 and female bay 117. Storage device 16 connects to a laptop computer 202, which includes mating connector 140. Mating connector 140 comprises tube 109, reserve volume 302 and male housing 113.

Mating connector 140 interfaces with connector 104 to permit transfer of hydrogen fuel source 17 from storage device 16 to laptop computer 202. In one embodiment, storage device 16 resembles a battery-sized cartridge including a female connector 104 that receives a male mating connector 140. Male housing 113 of mating connector 140 fits snugly into a female bay 117 of connector 104 (see FIG. 2G for side view of a bay 117). The fit provides mechanical support for the interface between mating connector 140 and connector 104. Distal end of tube 107 in storage device 16 and a distal end of tube 109 in mating connector 140 align when connector 104 and mating connector 140 join. In a specific embodiment, tube 109 comprises a pointed end that pierces into tube 107 and tube 109 comprises a diameter that snugly fits into tube 107 when connector 104 and mating connector 140 are attached.

When mating connector 140 and connector 104 are joined as shown, a pump run by a fuel cell system 10 within laptop computer 202 draws fluid from bladder 100 into the fuel cell system 10. More specifically, fuel source 17 travels from bladder 100, through tube 107 in connector 104, into and through tube 109 in mating connector 140, and through tube 109 in laptop computer 202 to a fuel processor 15 included therein.

Connector 104 and mating connector 140 may also include electrical connectivity for digital communication between memory 106 and a processor or controller (see FIG. 4) on laptop computer 202. FIG. 2F illustrates female electrical slots 155 on connector 104b. A mating connector 140 for connector 104b then includes male leads (not shown) that fit into slots 155 for electrical communication between laptop computer 202 and storage device 16.

For the embodiment of FIG. 2B, bladder 100 comprises a collapsible bellows design 126. One end 127a of bellows 126 attaches and opens to tube 107, while the opposite end 127b is free to move in direction 125. When bladder 100 fills with fuel source 17, free end 127b moves in direction 125 and bellows 126 expands and increases in volume. When bladder 100 loses fuel source 17, free end 127b moves opposite to direction 125 and bellows 126 collapses and decreases in volume. Free end 127b and bladder 100 thus compresses towards the location where fuel source 17 is outlet and where negative pressure is created to contract or collapse bellows 126 (tube 107 and connector 104 in this case). FIG. 2C illustrates a bellows configuration 126 at its maximum volume. As shown in FIG. 2B, bladder 100 is less than half full of fuel source 17 and assumes less than half the space in internal cavity 112. Bellows 126 comprises collapsible rings 128 that fold as bellows 126 expands (the angle of each ring 128 opens) and as bellows 126 collapse (the angle of each ring 128 closes). Bellows 126 may comprise plastic or Nickel, for example. Bellows 126 may be custom molded or electroformed. Similarly designed bellows are used to protect tubular warp in machine tools, for example. Servometer Corp. of New Jersey provides several suitable commercially available nickel bellows.

Storage device 16 includes an air vent 132 in housing 102 that allows air to enter and exit in internal cavity 112 within housing 102 as bladder 100 changes in volume. Air vent 132 comprises one or more holes or apertures in a wall 110 of housing 102. In operation, as fuel source 17 is consumed and drawn from storage device 16, bladder 100 collapses and creates a negative pressure in internal cavity 112 outside of bladder 100. Based on this negative pressure caused by a decreasing volume of bladder 100 (or increasing volume of internal cavity 112 outside bladder 100), air enters through air vent 132 into internal cavity 112 and displaces the decreasing volume of bladder 100. This prevents the pressure of fuel source 17 in bladder 100 from decreasing and affecting the ability of storage device 16 to provide fuel source 17 at a substantially constant pressure. When filling storage device 16, positive pressure caused by an increasing volume of fuel source 17 and bladder 100 causes air to exit through air vent 132. Since walls of bladder 100 separate fuel source 17 within bladder 100 from air in internal cavity 112, air in cavity 112 does not enter bladder 100 or mix with fuel source 17.

A filter 134 spans the cross section of air vent 132 and intercepts air passing through air vent 132. In one embodiment, filter 134 comprises a hydrophobic and gas permeable filter that prevents foreign materials from entering storage device 16. Materials blocked by filter 134 may include liquids and particles such as undesirable oils and abrasives that may affect storage device 16 performance. The hydrophobic filter also prevents fuel source 17 from escaping housing 102 in the event that bladder 100 develops a leak. Filter 134 may comprise micro porous Teflon or another micro porous material such as Teflon coated paper. A sintered metal filter, for example one with a 3 micron pore size, may also be used. One suitable filter 134 includes micro porous "Gore Tex" Teflon as provided by WL Gore Associates of Elkton, Md.

Mechanical shield 142 spans and covers air vent 132 and prevents foreign bodies from entering housing 102 through air vent 132 and damaging bladder 100. In one embodiment, air vent 132 is recessed into a wall 110 such that mechanical shield 142 is flush with the outer surface of housing 102. As shown, filter 134 is located internal to shield 142 such that shield 142 mechanically protects filter 134. In one embodiment, mechanical shield 142 includes a flame suppressor or a suitable means of flame suppression. The mechanical shield 142 then prevents flame propagation into or out from interior cavity 112. One suitable mechanical shield 142 includes cut to size 180×180 mesh stainless steel screen as provided by McNichols of Tampa, Fla.

Pressure relief valve 136 limits pressure in storage device 16. More specifically, pressure relief valve 136 releases fuel source 17 from bladder 100 when the pressure within bladder 100 reaches a threshold pressure. The threshold pressure refers to a pressure for bladder 100 that represents the upper limit of operational pressure for fuel source 17 use in storage device 16. Threshold pressures from about 5 psig to about 25 psig are suitable for some fuel sources 17 and storage devices 16. A threshold pressure of about 15 psig is suitable in many cases. Other suitable threshold pressures may relate to the boiling point of the fuel source 17, which ranges from about 2 Atm to about 10 Atm. Thus, if temperature for storage device 16 rises above the boiling point of fuel source 17, the threshold pressure is reached and pressure relief valve 136 releases fuel source 17 from bladder 100. During normal operation and storage, the partial pressure of fuel source 17 in bladder 100 is less than the threshold pressure and pressure relief valve 136 is not used. In the event that pressure of fuel source 17 in bladder 100 rises above the threshold pressure, pressure relief valve 136 releases fuel source 17 from bladder 100, thereby limiting the pressure within bladder 100.

In a specific embodiment, pressure relief valve 136 comprises a sprung diaphragm mechanism. The sprung diaphragm includes a diaphragm and a spring that attaches to the diaphragm. Pressure in bladder 100 pushes the diaphragm outward against the spring force. At the threshold pressure, the diaphragm opens a port—a small hole that opens outside of housing 102—to permit the release of fuel source 17 from bladder 100. Spring selection permits a designer to control the threshold pressure at which the port opens and fuel source 17 escapes. In another specific embodiment, pressure relief valve 136 comprises a burst disk mechanism that includes a thin diaphragm. The diaphragm breaks outward when pressure in bladder 100 rises above the threshold pressure. The diaphragm break and the resultant opening releases fuel source 17 from bladder 100. For either design, the port or opening may be configured to direct venting fuel vapors away from storage device 16 and into a ventilated area when installed in an electronics or OEM device.

A fuel source filter 144 intercepts fuel source 17 as it leaves bladder 100 and before it leaves connector 104. As shown, filter 144 spans an entrance to tube 107 from bladder 100. Fuel source filter 144 removes any contaminants or chemicals added to fuel source 17 for storage in bladder 100 and device 16. In one embodiment, fuel source 17 comprises an odorant 150, a bitterant 152 and/or a colorant 154 mixed therein. If fuel source 17 comprises an odorless liquid, odorant 150 provides olfactory stimulus to inform a person that fuel source 17 has escaped bladder 100 and storage device 16 via a path other than through tube 107 and filter 144. Two suitable odorants 150 includes trimethyl amine at 1-10 ppm in methanol and ethyl mercaptan at 1-7 ppm weight in methanol. Fuel source filter 144 removes odorant 150 from fuel source 17 when the fuel source leaves bladder 100 through tube 107.

If fuel source 17 comprises a colorless liquid, colorant 154 provides visual stimulus to inform a person that fuel source 17 has leaked or escaped from bladder 100 via a path other than through tube 107 and filter 144. Suitable colorants 154 include acid blue 9 at 1 ppm, table 5-4 food dye, and bright green/blue erioglaicine disodium salt as provided by Dudley Chemical Corp of Lakewood, N.J. Fuel source filter 144 removes colorant 154 from hydrogen fuel source 17 when the fuel source leaves bladder 100 through tube 107.

If fuel source 17 comprises liquid with no taste, a bitterant 152 may be added to provide taste stimulus that informs a person that fuel source 17 has escaped bladder 100 via a path other than through tube 107 and filter 144. One suitable bitterant 152 includes Denatonium Benzoate at 1-50 ppm (20-50 ppm is adversely bitter) as provided by Bitrex of Edinburgh, UK. Fuel source filter 144 removes bitterant 152 from hydrogen fuel source 17 when fuel source 17 leaves bladder 100 through tube 107. One suitable filter 144 for removing odorant 150, bitterant 152 and/or colorant 154 includes an ultra-pure polyethersulfone membrane. Another suitable filter 144 for removing odorant 150, bitterant 152 and/or colorant 154 from fuel source 17 includes 0.1 Advantage PS C-7012 filter as provided by Parker Hanafin Corp.

A fire retardant foam 138 is disposed in bladder 100. Foam 138 is compliant and conforms in size to the size of bladder 100. Thus, as bladder 100 collapses, foam 138 compresses. In one embodiment, foam 138 acts as a wicking foam that directs some flame behavior in storage device 16. One suitable foam 138 is polyurethane mil Spec Mil-B-83054 as provided by Foamex of Lindwood, Pa.

In one embodiment, memory 106 comprises a wireless identification (ID) tag. This allows memory 106 to communicate with an external device, such as hydrogen fuel source refiner 162 described in FIG. 3. In this case, the external device includes an interrogator that probes memory 106 via wireless communication when storage device 16 is in range of the interrogator. The interrogator may include any hardware for performing this function such as a computer, transceiver and interrogator antenna. Coupling between the interrogator and storage device 16 may occur via radio frequency (RF) or microwave frequency radiation. When probed by the interrogator, storage device 16 replies with its identification (as stored in a digital or electrical memory 106) and any other information stored in memory 106, such as the status of any sensors used in storage device 16 to monitor health of the device and sensors that detect the volume of fuel source in bladder 100. The storage device 16 identification provides a means for automated logging of data corresponding to the status of storage device 16. The identification also facilitates inventory logging of information for numerous storage devices 16.

In one embodiment, the interrogator provides power to storage device 16. The power is transmitted by RF waves, for example, and received by a rectifier in storage device 16 that rectifies the signal, thereby providing sufficient DC power to operate any circuitry of storage device 16. A transponder included in storage device 16 responds to a wireless stimulus. The transponder transmits signals when actuated by a signal from an external interrogator. In some cases, the transponder includes an amplifier for increasing the strength of a received incident signal, a modulator for modifying the signal with information stored by memory 106, and an antenna or antennas for receiving and transmitting signals.

Wireless ID tags are commercially well known and there exists numerous manufacturers that currently offer a wide selection of RFID tags. These tags are either passive (typically operating near 125 khz) or active (often operating near 2.45 GHz). Major manufacturers include Texas Instruments of Dallas, Tex. and Motorola of San Jose, Calif. or Alien Technologies of San Jose, Calif. Products are available for inventory control, product labeling, etc. For example, storage device 16 may use a commercial RFID tag, such as a 125-khz tag supplied by Texas Instruments of Dallas, Tex., which includes a microchip for memory 106 and inductor for wireless communication.

Storage device 16 may also comprise a sensor that monitors a condition related to the health or functioning of storage device 16. In one embodiment, the sensor comprises a wire 156 that runs about an inside surface of housing 102 or is formed within a wall 110 housing 102 (see FIG. 2C). An electrical state or performance of wire 156 provides an indication of the health of housing 102. Mechanical damage, cracking or structural compromise of housing 102 affects wire 156—mechanically and electrically. More specifically, when wire 156 breaks, stretches or loses contact due to mechanical changes housing 102, an electrical signal sent through wire 156 changes. The according change may be read and assessed. Thus, a break in wire 156 may be read by non-transmittance of a signal. Changes in electrical resistance of wire 156 may also provide an indication of health. In one embodiment, the sensor relies on external (e.g., RFID) probing to assess the state of wire 156 and health of housing 102. In this case, the interrogator powers memory 106 to test the resistance of wire 156. The RFID memory 106 then responds with a signal indicative of the status of wire 156. Although the sensor is shown as a single wire 156, it is understood that more complex designs may comprise filament networks that extend two dimensionally throughout housing 102. Each filament may then be probed for its electrical status, e.g., resistance to provide a meshed status check of integrity and health of housing 102 and storage device 16.

FIG. 2D illustrates a front view of fuel source storage device 16*a* in accordance with one embodiment of the present invention. FIG. 2E illustrates a front view of a storage device 16*b* that is partially compatible with storage device 16*a*. FIG. 2F illustrates a front view of a storage device 16*c* that is not compatible with storage device 16*a*. FIG. 2G illustrates a side view of a storage device 16*c*.

Connector 104 and/or mating connector 140 may include a "keyed" configuration that provides interface selectivity. For example, connector 104 may comprise a configuration unique to a particular hydrogen fuel source (e.g., methanol). In this case, mating connector 140 offers an exclusive interface that only receives a connector 104 for a methanol based storage device 16. This keying system prevents the wrong fuel type from being installed in a device that cannot accept that fuel, e.g., gasoline burns at a higher temperature and may not be suitable for use in all methanol fuel processors. This keying system also prevents storage device 16 from being refilled with the wrong hydrogen fuel source 17.

For example, storage device 16*a* of FIG. 2D includes a circular connector 104*a* that interfaces with a circular mating connector (not shown). Similarly, storage device 16*b* of FIG. 2E includes a circular connector 104*a* of the same dimensions that interfaces with the same circular mating connector as that employed for connector 104*a*. The storage device 16*c* of FIG. 2F includes a rectangular connector 104*b* that would not interface with the same circular mating connector. Circular connectors 104*a* may be used for methanol fuel mixtures of different blends for example, while rectangular connector 104*b* is used for ethanol.

The keyed configuration of connector also allows for variation of one of connector 104 or mating connector 140, while the other remains constant. This controlled variability has numerous commercial applications. In one commercial system, connector 104 may change slightly while mating connector 140 remains constant. A common mating connector 140 may receive different storage devices 16 that share a connector 104*a* configuration. The different storage devices 16 may be produced by different manufacturers and may include varying volumes or other storage device 16 features. This permits competition for the provision of storage devices 16 but standardization of their interface. In another commercial application, an electronics device manufacturer such as Dell specifies a custom mating connector 140 configuration (e.g., a circular configuration used in their laptop computers and other electronics devices). All storage devices 16 that service these electronics devices must then include a connector 104 that matches Dell's custom mating connector 140 configuration. The electronics device manufacturer may then control who manufacturers storage devices 16 and connectors 104 for use with their electronics devices. Keyed connectors 104*a* for one electronics device manufacturer may also be designed to not fit a mating connector 140 for another computer manufacturer, e.g., Apple employs a rectangular configuration 104*b*.

Custom connector 104 and mating connector 140 configurations may vary based on geometry, dimensions, depth and size for example. A connector 104 or mating connector 140 may also include one or more features 149 that distinguish a custom connector or mating connector. As shown in FIG. 2E, feature 149 is a tab that extends into the female bay 117 of connector and mechanically distinguishes storage device 16*b* from storage device 16*a*.

Connector 104/mating connector 140 configuration selectivity may also be implemented to distinguish developing technology in fuel cell system 10 or storage device 16. By changing mating connector 140 to receive only certain connectors 104, the present invention permits continuing development of fuel cell system 10 or storage device 16 and ensures rejection of previous storage device 16 models that are no longer suitable. For example, storage device 16b may represent a newer version of storage device 16a that is mechanically distinguished by feature 149. An electronics device that receives storage devices 16 may include a mating connector 140 that mechanically rejects storage device 16a based omission of feature 149. Memory 106 may also be digitally read to indicate incompatibility.

The keyed configurations shown in FIGS. 2D-2F may also be implemented for particular fuel source 17 types. For example, storage device 16a and connector 104a may designate a methanol fuel mixture "A%", while storage device 16b and feature 149 designate a methanol fuel mixture "B%" and storage device 16c and connector 104b designates an ethanol fuel mixture.

Storage devices 16a also comprise "break-off" pins 158 that form a mechanical memory 106. Pins 158 indicate the number of refills for each storage device 16. Each time storage device 16 is refilled, the refiner breaks a pin 158. When all the pins have been removed, a mating connector to connector 104 will not accept storage device 16. Pins 158 may comprise plastic and be molded into the cartridge housing 102 or to connector 104.

In one embodiment, storage device 16 is intended for disposable use. In this case, a user purchases a storage device 16 with a full complement of methanol and disposes of storage device 16 after it is emptied. In another embodiment, storage device 16 is intended for reusable use. A reusable storage device 16 provides less waste. In this case, storage device 16 is refilled by a hydrogen fuel source refiller.

Figure 3:
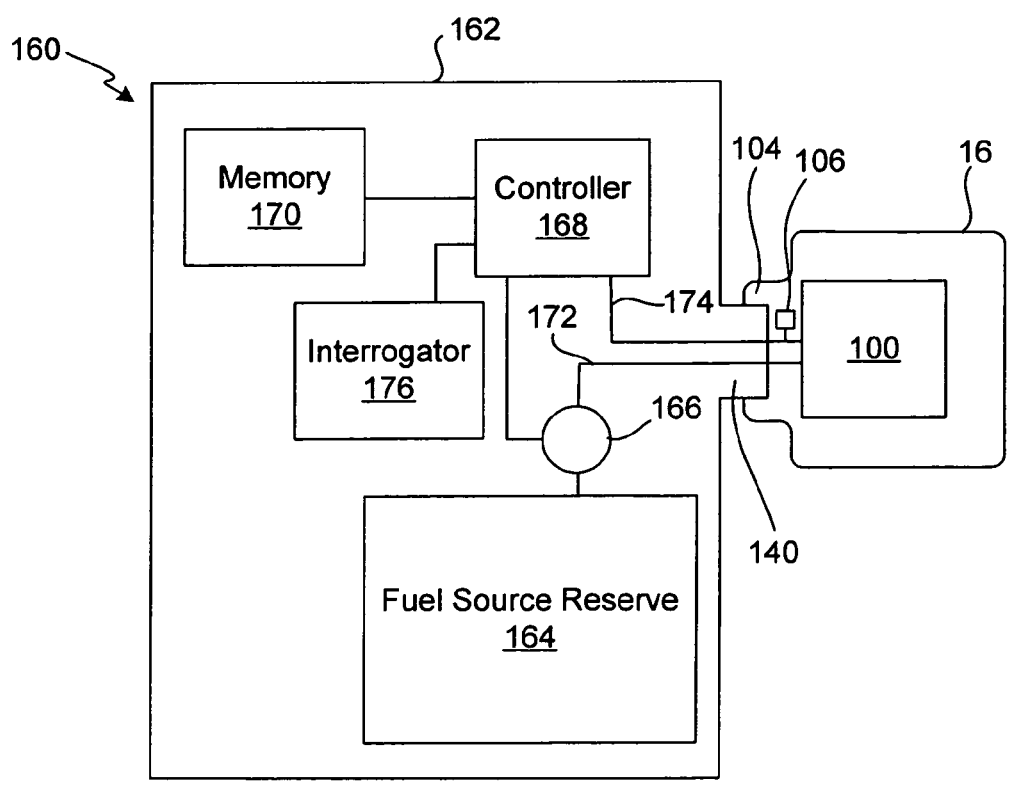
FIG. 3 illustrates of a system for refilling a hydrogen fuel source storage device in accordance with one embodiment of the present invention.

FIG. 3 Illustrates a system 160 for providing a refillable hydrogen fuel source storage device 16 in accordance with one embodiment of the present invention. System 160 comprises storage device 16 and a hydrogen fuel source refiner 162.

Hydrogen fuel source refiller 160 includes mating connector 140 and is configured to provide hydrogen fuel source 17 to storage device 16 when the connector 104 is coupled to mating connector 140. Connector 104 and mating connector 140 interface to permit transfer of fuel source 17 from refiner 160 to storage device 16. Refiller 160 comprises a fuel reserve tank 164 that stores hydrogen fuel source 17. Tank is suitably size to refuel numerous storage devices 16. A pump 166 receives control signals from a refiner controller 168 that controls functioning of refiner 160 based on stored commands in refiner memory 170. Refiller memory 170 may also include a database that stores information for each storage device 16 serviced by refiner 160.

A line 172 transports fuel source 17 from tank 164 to storage device 16. More specifically, pump 166 moves fluid fuel source 17 from tank 164 through tube 109 in mating connector 140, into and through tube 107 in connector 104, and into bladder 100 for storage therein. Although refiner 160 is shown refilling a single storage device 16, it is understood that refiller 160 may comprise multiple "bays" that each include a mating connector 140 and plumbing to refill a single storage device 16. Refiller 160 may also include multiple tanks 164 that provided different fuel sources 17, such as different fuel sources (e.g., methanol or ethanol) or different fuel mixtures.

Controller 168 also communicates with memory 106 via line 174, which travels from controller 168, through electrical connectivity provided by connector 104 and mating connector 140 and to memory 106. Controller 168 may also communicate with memory 106 via wireless means as described above if controller 168 and memory 106 both include such capability. Refiller 160 includes an interrogator 176 to communicate wirelessly with a storage device 16. Interrogator 176 comprises a transceiver and antenna based on the communication frequency employed.

Controller 168 reads from and writes to memory 106. Controller 168 may read and store the usage history of a digital memory 106. When storage device 16 includes a mechanical memory such as the break-off pins 158 described above, refiner 162 checks if there are any pins 158 remaining (either mechanically or electronically). If all the pins have been removed, refiner 162 does not accept storage device 16. Controller 168 may also check the status of any sensors on storage device 16 used to monitor health of the device 16, such as an RDIF sensor that detects housing integrity. This helps a re-filling services provider determine if storage device 16 can be simply be refilled, or if it needs to refurbished as well. Via controller 168 and stored logic that dictates responses to information read from memory 106, refiner 162 is thus configured to detect a defect in storage device 16 and not transfer hydrogen fuel source 17 to storage device 16 when a predetermined memory element is present. Memory elements may include use of a pressure relief valve or information related to the status of any sensors on storage device 16.

Controller 168 may also write into memory 106 information such as: the hydrogen fuel mixture information stored therein, an updated number of refills provided to storage device 16, the refill date, the refilling service provider, and a volume for the storage device. When storage device 16 includes a mechanical memory such as the break-off pins 158 described above, refiner 162 breaks a pin 158 upon refill completion.

Refillable system 160 allows distribution of the hydrogen fuel source 17 to be handled flexibly. One approach is to distribute refillable storage devices 16 similar to the distribution of batteries. A consumer purchases a desired storage device 16 at a retail outlet, such as a department store, super market, airport kiosk or drug store etc. Storage device 16 selection may vary based on fuel source 17 capacity, fuel source 17 type or other features such as connectivity and smart features. Spent storage devices 16 may be dropped off at the any of the above locations for reuse, and shipped to a refilling services provider for refurbishment and refill.

When storage device 16 comprises a hydrogen fuel cleaning system, refiner 162 may also rejuvenate or check for replacement of the cleaning system. For the scrubbing bed as described below with respect to filter 220, refiner 162 rejuvenates the cleaning system by forcing hydrogen through the bed (e.g., using hydrogen in tank 164). The scrubbing bed filter 220 may also be replaced with a new bed when the storage device 16 is refilled.

Refilling system 160 allows a hydrogen fuel source 17 refilling provider to control refilling of storage devices 16. Connectors 104 that require specific parts on mating connector 140 to complete interface and permit fluid transfer into storage device 16 also prevent free tampering and addition of fluids to storage device 16. Refilling system 160 also provides a business model for distribution of storage devices 16. Refilling system 160 also permits the hydrogen fuel source 17 refilling provider to certify fuel blends, monitor the number of refills for a particular storage device 16, and validate storage device 16 for consumer or manufacturer confidence.

Figure 4:
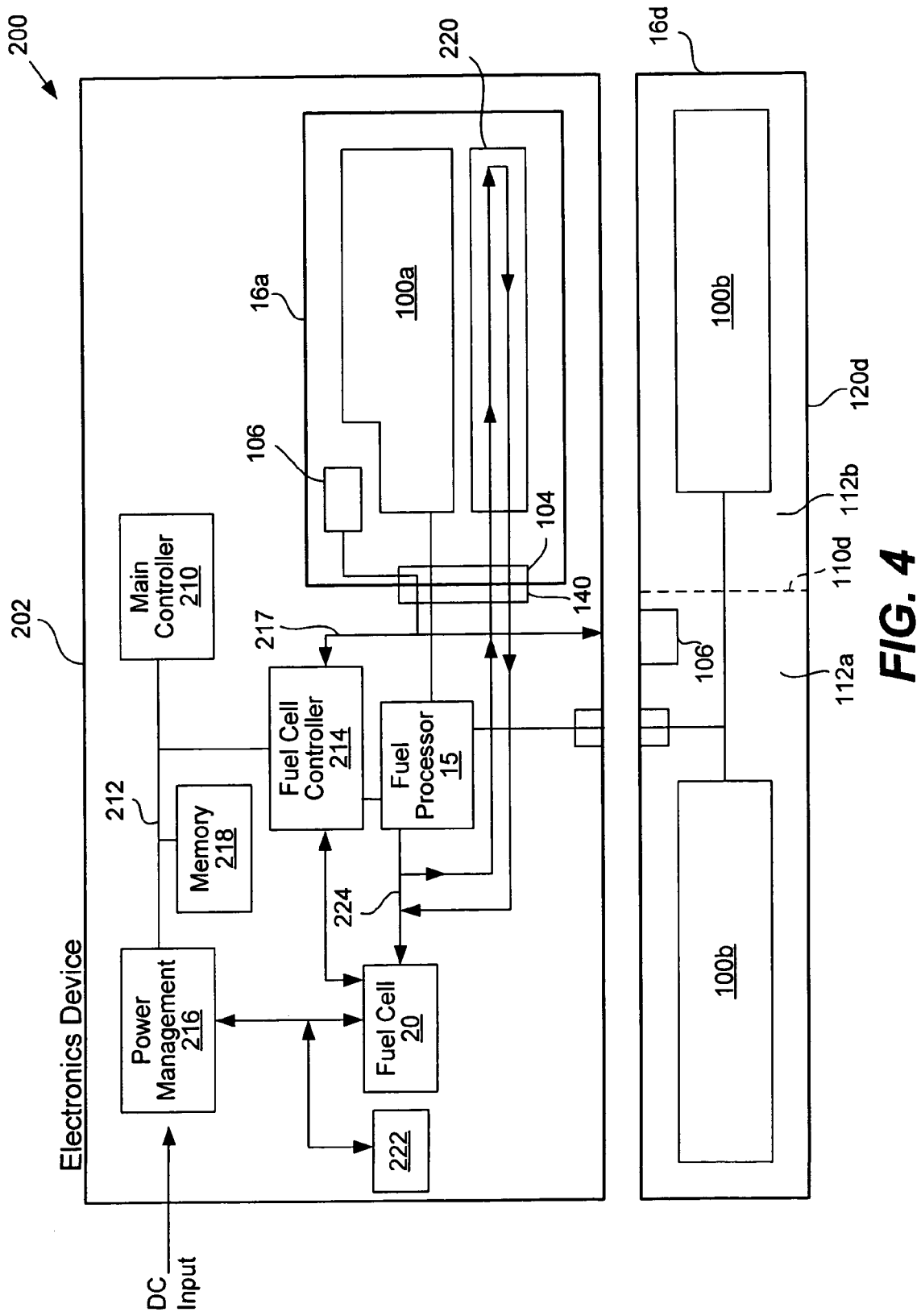
FIG. 4 illustrates of a system for producing electrical energy for a portable electronics device in accordance with one embodiment of the present invention.

FIG. 4 shows a schematic illustration of a system 200 for producing electrical energy for a portable electronics device in accordance with one embodiment of the present invention. System 200 comprises fuel processor 15 and fuel cell 20 included within an electronics device 202 and a hydrogen fuel source storage device 16 coupled to electronics device 202 via connector 104 and mating connector 140. Electronics device 202 may comprise any portable or stationary electronics device or power application that relies on a fuel cell to generate electrical energy.

In one embodiment, fuel processor 15 and fuel cell 20 are incorporated into electronics device 202 (within its volume and outer housing) as an integral module, and storage device 16 is removable allowing for instant recharging. Fuel cell powered laptop computers 202 may comprise slightly modified existing products, with fuel processor 15 and fuel cell 20 and related system components fitted generally into the space provided for a battery pack. Mating connector 140 is included in this allocated space for connection to storage device 16. Storage device 16 mechanically interfaces with electronics device 202. In one embodiment, connectors 104 and 140 provide sufficient mechanical force to maintain position between the storage device 16 and electronics device 202. In another embodiment, electronics device 202 includes a mechanical slot that storage device 16 fits and slides into. In one embodiment, an external cartridge-mounting bracket is provided to allow for larger storage devices 16 to be used.

When connector 104 and mating connector 140 interface, fuel cell system controller 214 digitally communicates with memory 106 using link 217 for bi-directional communication therebetween. In another embodiment, controller 214 uses a wireless interrogator to communicate with an RFID antennae and memory 106 included in storage device 16. Controller 214 may read any information stored in memory 106 such as a fuel type stored in the storage device 16, a model number for storage device 16, a volume capacity for bladder 100 or storage device 16, a number of refills provided to storage device 16, the last refill date, the refilling service provider, and a current volume for the storage device. In one commercial application, different bladder 100 volumes and storage device 16 configurations are offered based on different laptop computer manufacturers and models for a particular manufacturer. The volume may be configured to meet a specific run time requirement for a particular laptop model, for example. In this case, controller 214 estimates the remaining power in storage device 16 by comparing the fuel source 17 level since last use or refill against a consumption rate for a particular laptop computer.

Controller 214 may also write transient information to memory 106, such as an updated volume for the storage device. The controller 214 communicates with a main controller 210 for computer 202 and computer memory 218 via communications bus 212. Computer memory 218 may store instructions for the control of fuel system 10 such as read and write protocol and instructions for communication with a digital memory 106.

System 200 also comprises a hydrogen fuel cleaning system. As shown, storage device 16 comprises a filter 220 in fluidic communication with hydrogen 224 output by fuel processor 15. Filter 220 removes contaminants from the hydrogen 224 stream (or reformate) before receipt by fuel cell 20. The reformate often includes hydrogen, carbon dioxide, carbon monoxide and other small particulates. Filter 220 may remove carbon monoxide, un-converted methanol vapor and/or hydrogen sulfide (among others). As shown, line 226 routes reformate 224 output by a hydrogen outlet of fuel processor 15, back through mating connector 140 and connector 104, into storage device 16 and through filter 220, back out of in storage device 16 and to an anode inlet of fuel cell 20. In a specific embodiment, filter 220 comprises a carbon monoxide scrubbing catalyst or absorbent arranged in a bed that hydrogen 224 stream passes through. The bed is filled with a material, such as activated carbon, potassium permanganate or cupric chloride ($CuCl_2$). The catalyst or absorbent absorbs CO, methanol vapor or $H_2S$. As described above, the scrubbing bed may be rejuvenated by passing hydrogen through the bed when the storage device 16 is refilled. Or the scrubbing bed may be replaced with a new bed when the storage device 16 is refilled. Filter 220 simplifies chemical management for fuel processor 15 and increases the performance of fuel cell 20. Filter 220 also reduces poisoning of the fuel cell 20 catalysts with un-converted methanol vapors, by trapping the vapors prior to the hydrogen 224 stream entering fuel cell 20. In another embodiment, a line routes unused hydrogen from fuel cell 20 in the anode exhaust to fuel processor 15 to further increase efficiency of the fuel cell system in device 202. Further discussion of fuel cell systems suitable for use with the present invention are described in commonly owned co-pending patent application entitled "Micro Fuel Cell Architecture" naming Ian Kaye as inventor and filed on Jun. 25, 2004, which is incorporated by reference for all purposes.

Power management 216 controls power provision by fuel cell system 10 and electrochemical battery 222. Thus, power management 216 may inform controller 214 how much power is needed for laptop computer 202 operation and controller 214 responds by sending signals to fuel cell 20, fuel processor 15 and a pump that draws fuel from storage device 16 to alter fuel cell power production accordingly. If fuel cell system 10 runs out of fuel source 17, then power management 216 switches to electrical power provision from battery 222.

A spare storage device 16*d* is included in system 200. Storage device 16*d* shares a connector 104 with storage device 16*a* (currently plugged in). Storage device 16*d* comprises a dual internal compartment 112*a* and 112*b* configuration internal to housing 102*d* divided by internal wall 10*d*. Internal compartment 112*a* includes a first bladder 100*b* while internal compartment 112*b* includes a second bladder 100*b*. The dual bladder design of storage device 16*d* provides extended power back up for system 200.

System 200 may also be configured for "hot swappable" capability. As the term is used herein, hot swapping of storage device 16 refers to removing storage device 16 from a fuel processor or electronics device it provides hydrogen fuel source 17 to, without shutting down the receiving device or without compromising hydrogen fuel source provision to the receiving device for a limited time. A hot swappable system implies fuel source provision when connector 104 and mating connector 140 are separated. Referring back to FIG. 2A, electronics device 202 comprises a reserve volume 302 that is configured to store the hydrogen fuel source 17 when connector 104 and mating connector 140 are separated.

The time that a receiving fuel processor or electronics device may be operated for while connector 104 and mating connector 140 are separated relates to the amount of fuel in reserve volume 302 and the rate at which the fuel processor or electronics device uses fuel source 17. A maximum volume for reserve volume 302 characterizes the capacity of fuel source 17 that reserve volume 302 can store. In one embodiment, reserve volume 302 includes a maximum volume between about 1 milliliter and about 50 milliliters. A maximum volume between about 1 milliliter and about 4 milliliters may be suitable for some portable electronics applications.

For the storage device 16 shown in FIG. 2C, reserve volume 302 comprises the volume of tube 109 between its upstream end where it interfaces with connector 104 and its downstream end where it opens to the fuel processor 15. The inner diameter of tube 109 may be configured to provide a particular volume maximum for reserve volume 302. In one embodiment, tube 109 comprises plastic tubing with an outer diameter less than ¼ of an inch and a tube wall thickness between about 10 and about 50 mils.

For the storage device 16 shown in FIG. 2B, reserve volume 302 comprises a cavity within connector 140 that acts as a small reservoir for fuel source 17 entering the electronics device 202. The cavity permits larger maximum volumes for reserve volume 302. The cavity may alternatively be configured downstream of connector 140 within the device 202 to receive fuel source 17 from line 109 after it passes through connector 140, e.g., closer to fuel processor 15. In this case, the maximum volume for reserve volume 302 includes contributions from both the cavity and tubing 109 traveling from the cavity to the fuel processor.

Reserve volume 302 may also comprise a bladder that conforms in size and shape to the volume of fuel source 17 contained therein. A rubber sac or foldable bellows similar to those described above may be suitable. In one embodiment, tube 109 collapses on itself when mating connector 140 and connector 140 are separated. This seals tube 109 and prevent escape of any fuel source 17 contained therein.

While this invention has been described in terms of several preferred embodiments, there are alterations, permutations, and equivalents that fall within the scope of this invention which have been omitted for brevity's sake. For example, although the present invention has been described with respect to separate main controller 210 and fuel cell system controller 214, it is understood that these two functional elements may be combined into a common controller. In addition, while the present invention has been described with respect to reformed methanol fuel cell systems that include a fuel processor to convert the fuel source to hydrogen before receipt by the fuel cell, storage devices described herein are also useful for direct fuel source systems such as direct methanol fuel cell systems. In a direct fuel source system, the storage device provides the fuel source directly to the fuel cell without conversion to hydrogen by a separate fuel processor. While not described in detail, such digital control of a mechanical system is well known to one of skill in the art. It is therefore intended that the scope of the invention should be determined with reference to the appended claims.

What is claimed is:

1. A hydrogen fuel source cartridge for storing a hydrogen fuel source, the cartridge comprising:
   a bladder that contains the hydrogen fuel source;
   a housing having an internal cavity that includes the bladder;
   a connector that interfaces with a mating connector to permit transfer of the fuel source between the bladder and a device that includes the mating connector;
   a vent in the housing that allows air to enter and exit the internal cavity; and
   a hydrophobic and gas permeable filter configured to intercept air entering or exiting the housing through the vent.

2. The cartridge of claim 1 wherein the hydrophobic and gas permeable filter is configured to prevent the hydrogen fuel source from exiting the housing though the vent.

3. The cartridge of claim 1 wherein the hydrophobic and gas permeable filter is configured to prevent a foreign fluid or particle from entering the housing though the vent.

4. The cartridge of claim 1 further comprising a mechanical shield that spans the vent and prevents a foreign object from reaching the filter.

5. The cartridge of claim 4 wherein the mechanical shield is arranged outside the filter and disposed flush with or recessed from an outer surface of a wall in the housing.

6. The cartridge of claim 4 wherein the mechanical shield includes a flame suppressing material.

7. The cartridge of claim 6 wherein the mechanical shield includes a porous metal mesh.

8. The cartridge of claim 1 further comprising a flame suppressant disposed in the vent.

9. The cartridge of claim 1 wherein the hydrophobic and gas permeable filter spans a cross section of the air vent.

10. The cartridge of claim 1 wherein the vent includes more than one hole in the housing.

11. The cartridge of claim 1 wherein the bladder conforms to the volume of the hydrogen fuel source in the bladder.

12. The cartridge of claim 1 wherein a decrease in volume of the hydrogen fuel source in the bladder draws air into the internal cavity and through the vent and filter.

13. The cartridge of claim 1 wherein the hydrogen fuel source includes methanol.

14. A hydrogen fuel source storage device for storing a hydrogen fuel source, the storage device comprising:
   a bladder that contains the hydrogen fuel source;
   a housing having an internal cavity that includes the bladder;
   a connector that interfaces with a mating connector to permit transfer of the fuel source between the bladder and a device that includes the mating connector;
   a vent in the housing that allows air to enter and exit the internal cavity; and
   a hydrophobic and gas permeable filter configured to intercept air entering or exiting the housing through the vent; and
   a mechanical shield that spans the vent and prevents a foreign object from reaching the filter.

15. The storage device of claim 14 wherein the hydrophobic and gas permeable filter is configured to prevent the hydrogen fuel source from exiting the housing though the vent.

16. The storage device of claim 14 wherein the mechanical shield is arranged outside the filter and disposed flush with or recessed from an outer surface of a wall in the housing.

17. The storage device of claim 14 wherein the mechanical shield includes a flame suppressing material.

18. The storage device of claim 14 wherein the bladder conforms to the volume of the hydrogen fuel source in the bladder.

19. The storage device of claim 14 wherein a decrease in volume of the hydrogen fuel source in the bladder draws air into the internal cavity and through the vent, filter and mechanical shield.

20. A hydrogen fuel source storage device for storing a hydrogen fuel source, the storage device comprising:
   a bladder that contains the hydrogen fuel source;
   a housing having an internal cavity that includes the bladder;

a connector that interfaces with a mating connector to permit transfer of the fuel source between the bladder and a device that includes the mating connector; and a pressure relief configured to limit pressure of the hydrogen fuel source in the storage device.

21. The storage device of claim 20 wherein the pressure relief is configured to limit pressure in the bladder.

22. The storage device of claim 21 wherein the pressure relief includes a relief valve that releases the hydrogen fuel source from the bladder when pressure within the hydrogen fuel source reaches a threshold pressure.

23. The storage device of claim 22 wherein the threshold pressure is less than or equal to the boiling point of the hydrogen fuel source.

24. The storage device of claim 22 wherein the relief valve is included in the connector.

25. The storage device of claim 20 further comprising a vent that allows air to enter and exit the internal cavity.

26. The storage device of claim 20 wherein the pressure relief is included in the housing.

27. The storage device of claim 26 wherein the pressure relief is configured to release the hydrogen fuel source from the internal cavity.

28. The storage device of claim 27 further comprising a hydrophobic and gas permeable filter that is configured to intercept the hydrogen fuel source as it exits the internal cavity.

29. The storage device of claim 28 wherein the pressure relief is configured to release the hydrogen fuel source from the storage device when the hydrogen fuel source in the storage device reaches a threshold pressure.

30. The storage device of claim 20 wherein the pressure relief includes a spring.

31. A hydrogen fuel source hydrogen fuel source storage device for storing a hydrogen fuel source, the storage device comprising:

a bladder that contains the hydrogen fuel source;

a housing that provides mechanical protection for the bladder;

a connector that interfaces with a mating connector to permit transfer of the fuel source between the bladder and a device that includes the mating connector; and a pressure relief valve configured to limit pressure in the bladder by releasing hydrogen fuel source from the bladder when pressure within the bladder reaches a threshold pressure.

32. The storage device of claim 31 wherein the pressure relief includes a relief valve that releases the hydrogen fuel source from the bladder when pressure within the bladder reaches a threshold pressure.

33. The storage device of claim 32 wherein the threshold pressure is less than or equal to the boiling point of the hydrogen fuel source.

34. The storage device of claim 33 wherein the relief valve is included in the connector.

* * * * *

UNITED STATES PATENT AND TRADEMARK OFFICE
CERTIFICATE OF CORRECTION

| | | |
|---|---|---|
| PATENT NO. | : 7,291,191 B2 | |
| APPLICATION NO. | : 11/229049 | |
| DATED | : November 6, 2007 | |
| INVENTOR(S) | : Ian W. Kaye | |

It is certified that error appears in the above-identified patent and that said Letters Patent is hereby corrected as shown below:

Col. 2, line 42, change "refiner" to --refiller--.

Col. 2, line 43, change "refiner" to --refiller--.

Col. 10, line 10, change "refiner" to --refiller--.

Col. 14, line 64, change "refiner" to --refiller--.

Col. 15, line 32, change "khz" to --kHz--.

Col. 16, line 16, change "bums" to --burns--.

Col. 17, line 22, change "refiner" to --refiller--.

Col. 17, line 39, change "refiner" to --refiller--.

Col. 17, line 45, change "refiner" to --refiller--.

Col. 17, line 48, change "refiner" to --refiller--.

Col. 17, line 49, change "refiner" to --refiller--.

Col. 17, line 50, change "refiner" to --refiller--.

Col. 17, line 52, change "refiner" to --refiller--.

Col. 17, line 57, change "refiner" to --refiller--.

Col. 18, line 12, change "refiner" to --refiller--.

Col. 18, line 14, change "refiner" to --refiller--.

Col. 18, line 22, change "refiner" to --refiller--.

Col. 18, line 34, change "refiner" to --refiller--.

UNITED STATES PATENT AND TRADEMARK OFFICE
CERTIFICATE OF CORRECTION

PATENT NO. : 7,291,191 B2
APPLICATION NO. : 11/229049
DATED : November 6, 2007
INVENTOR(S) : Ian W. Kaye It is certified that error appears in the above-identified patent and that said Letters Patent is hereby corrected as shown below:

Col. 18, line 49, change "refiner" to --refiller--.

Col. 18, line 51, change "refiner" to --refiller--.

Col. 20, line 42, change "$10d$." to --$110d$.--.

Signed and Sealed this

Eighteenth Day of November, 2008

JON W. DUDAS
*Director of the United States Patent and Trademark Office*